(12) United States Patent
Zhang et al.

(10) Patent No.: US 11,570,028 B2
(45) Date of Patent: *Jan. 31, 2023

(54) PHYSICAL BROADCAST CHANNEL SENDING/RECEIVING METHOD, AND APPARATUS

(71) Applicant: Huawei Technologies Co., Ltd., Shenzhen (CN)

(72) Inventors: Xu Zhang, Beijing (CN); Jianqin Liu, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 59 days.

This patent is subject to a terminal disclaimer.

(21) Appl. No.: 17/032,376

(22) Filed: Sep. 25, 2020

(65) Prior Publication Data

US 2021/0083717 A1 Mar. 18, 2021

Related U.S. Application Data

(63) Continuation of application No. 16/272,772, filed on Feb. 11, 2019, now Pat. No. 10,812,131, which is a
(Continued)

(51) Int. Cl.
*H04L 27/26* (2006.01)
*H04L 5/00* (2006.01)
(Continued)

(52) U.S. Cl.
CPC ..... *H04L 27/2613* (2013.01); *H04B 1/70735* (2013.01); *H04L 5/0019* (2013.01);
(Continued)

(58) Field of Classification Search
CPC ...... H04L 1/70735; H04B 2001/70724; H04B 7/0617; H04B 7/26; H04L 5/0019;
(Continued)

(56) References Cited

U.S. PATENT DOCUMENTS 6,564,052 B1 5/2003 Kawano et al.
8,582,505 B2 11/2013 Luo et al.
(Continued)

FOREIGN PATENT DOCUMENTS

CN 101651509 A 2/2010
CN 101998597 A 3/2011
(Continued)

OTHER PUBLICATIONS

Huawei, HiSilicon, "Unified single/multiple beam operations for initial access", [3GPP TSG RAN WG1 #87, R1-1611667, Nov. 14-18, 2016, 10 pages, Reno, USA.
(Continued)

*Primary Examiner* — Ayaz R Sheikh
*Assistant Examiner* — Louis Samara
(74) *Attorney, Agent, or Firm* — Slater Matsil, LLP

(57) ABSTRACT

This application provides a physical broadcast channel sending/receiving method and an apparatus. In the method, after receiving two broadcast channel signals on two corresponding physical broadcast channels at two time-frequency resource locations, the terminal device determines that information other than an offset of a corresponding time-frequency resource location is the same in two pieces of broadcast information carried in the two broadcast channel signals, obtains a time offset difference between the foregoing two time-frequency resource locations, and generates a scrambling sequence based on the time offset difference; and the terminal device separately descrambles the two broadcast channel signals based on the scrambling sequence and a preset scrambling sequence, thereby implementing joint decoding on the two broadcast channel signals, to obtain one piece of broadcast information.

20 Claims, 11 Drawing Sheets

Related U.S. Application Data continuation of application No. PCT/CN2017/097226, filed on Aug. 11, 2017.

(51) Int. Cl.
*H04W 48/12* (2009.01)
*H04B 1/7073* (2011.01)
*H04L 25/03* (2006.01)
*H04W 56/00* (2009.01)
*H04B 1/707* (2011.01)

(52) U.S. Cl.
CPC ...... *H04L 5/0053* (2013.01); *H04L 25/03866* (2013.01); *H04W 48/12* (2013.01); *H04W 56/004* (2013.01); *H04B 2001/70724* (2013.01)

(58) Field of Classification Search
CPC ............. H04L 5/0053; H04L 25/03866; H04L 27/2613; H04W 48/12; H04W 56/004; H04W 72/005; H04W 72/042; H04W 56/001

See application file for complete search history.

(56) References Cited

U.S. PATENT DOCUMENTS

| | | | |
|---|---|---|---|
| 9,516,626 B2 | 12/2016 | Barany et al. | |
| 10,284,320 B2 * | 5/2019 | Frenne | H04L 27/2692 |
| 2008/0311902 A1 | 12/2008 | Diepstraten et al. | |
| 2012/0014477 A1 * | 1/2012 | Ko | H04L 5/0007 |
| | | | 375/299 |
| 2012/0307726 A1 * | 12/2012 | Pi | H04L 5/0053 |
| | | | 370/328 |
| 2014/0031031 A1 * | 1/2014 | Gauvreau | H04L 1/0002 |
| | | | 455/426.1 |
| 2014/0086217 A1 | 3/2014 | Park et al. | |
| 2015/0085717 A1 | 3/2015 | Papasakellariou et al. | |
| 2015/0103800 A1 | 4/2015 | Seo et al. | |
| 2016/0028448 A1 * | 1/2016 | Park | H04B 7/26 |
| | | | 375/267 |
| 2017/0026100 A1 * | 1/2017 | Wang | H04W 72/042 |
| 2019/0141674 A1 * | 5/2019 | Tang | H04W 56/001 |
| 2020/0296765 A1 * | 9/2020 | Kim | H04W 56/001 |
| 2021/0266873 A1 * | 8/2021 | Jiang | H04W 56/0015 |

FOREIGN PATENT DOCUMENTS

| | | | | |
|---|---|---|---|---|
| CN | 102802091 A | 11/2012 | | |
| CN | 102918789 A | 2/2013 | | |
| CN | 104104466 A | 10/2014 | | |
| CN | 104969608 A | 10/2015 | | |
| EP | 3349522 B1 * | 9/2021 | ........... | H04B 7/0617 |
| WO | 2015080646 A1 | 6/2015 | | |

OTHER PUBLICATIONS

"Text Proposal for Stage 2 Description of Second Broadcast Channel," Agenda Item: 10.4.1, BCH2 design aspects, Source: Ericsson, Document for: Discussion and Decision, 3GPP TSG RAN WG2 #86, R2-142217, Seoul, South Korea, May 19-23, 2014, 4 pages.

* cited by examiner

301

A base station sends at least two physical broadcast channels by occupying at least two time-frequency resource locations in a radio frame, where one time-frequency resource location is corresponding to one physical broadcast channel, the physical broadcast channel carries broadcast information, the broadcast information includes a time offset of a time-frequency resource location corresponding to the physical broadcast channel, the time offset of the time-frequency resource location corresponding to the physical broadcast channel is information about a time interval between a time location of the time-frequency resource location corresponding to the physical broadcast channel in time domain and a frame header location of the radio frame, and time offsets of the time-frequency locations included in broadcast information carried on the at least two physical broadcast channels are different

302

The base station sends indication information specific to the at least two physical broadcast channels, where the indication information is used to notify a terminal device that information other than the time offsets of the time-frequency resource locations is the same in the broadcast information carried on the at least two physical broadcast channels

A terminal device receives a first broadcast channel signal on a corresponding first physical broadcast channel at a first time-frequency resource location in a radio frame, and receives a second broadcast channel signal on a corresponding second physical broadcast channel at a second time-frequency resource location, where the first broadcast channel signal carries first broadcast information, the first broadcast information includes a time offset of the first time-frequency resource location, the second broadcast channel signal carries second broadcast information, the second broadcast information includes a time offset of the second time-frequency resource location, and a time offset of any time-frequency resource location is information about a time interval between a time location of the time-frequency resource location in time domain and a frame header location of the radio frame

502

The terminal device determines that first information in the first broadcast information is the same as second information in the second broadcast information, where the first information is information other than the time offset of the first time-frequency resource location in the first broadcast information, and the second information is information other than the time offset of the second time-frequency resource location in the second broadcast information

503

The terminal device determines a time offset difference between the first time-frequency resource location and the second time-frequency resource location in time domain, obtains a difference sequence corresponding to the time offset difference, and generates a scrambling code sequence based on the difference sequence, where one time offset difference is corresponding to one unique difference sequence

504

The terminal device descrambles the first broadcast channel signal based on the scrambling code sequence, and performs joint demodulation and decoding on the descrambled first broadcast channel signal and the descrambled second broadcast channel signal, to obtain the second broadcast information

FIG. 5

CONT.
FROM
FIG. 7A

CONT.
FROM
FIG. 7A

706. Descramble a received first broadcast channel signal based on the scrambling code sequence, and descramble a received second broadcast channel signal based on a second scrambling code sequence 707. Perform joint decoding on the two descrambled broadcast channel signals, to obtain the second broadcast information 708. Determine a frame header location of a radio frame based on a time offset of the second time-frequency resource location in the second broadcast information 709. Access a network based on the frame header location of the radio frame and system information in the second broadcast information

FIG. 7B

CONT.
FROM
FIG. 8A

CONT.
FROM
FIG. 8A

805. Determine a time offset difference between a first time-frequency resource location occupied by a first physical broadcast channel and a second time-frequency resource location in time domain, obtains a difference sequence corresponding to the time offset difference, and generates a scrambling code sequence based on the difference sequence 806. Descramble the received first broadcast channel signal based on the scrambling code sequence, and descramble the received second broadcast channel signal based on the second scrambling code sequence 807. Perform joint decoding on the two descrambled broadcast channel signals, to obtain the second broadcast information 808. Determine a frame header location of a radio frame based on a time offset of the second time-frequency resource location in the second broadcast information 809. Access a network based on the frame header location of the radio frame and system information in the second broadcast information

FIG. 8B

PHYSICAL BROADCAST CHANNEL SENDING/RECEIVING METHOD, AND APPARATUS

CROSS-REFERENCE TO RELATED APPLICATIONS

This application is a continuation of U.S. patent application Ser. No. 16/272,772, filed on Feb. 11, 2019, which is a continuation of International Application No. PCT/CN2017/097226, filed on Aug. 11, 2017, which claims priority to Chinese Patent Application No. 201610666756.9, filed on Aug. 12, 2016. All of the afore-mentioned patent applications are hereby incorporated by reference in their entireties.

TECHNICAL FIELD

This application relates to the field of communications technologies, and in particular, to a physical broadcast channel sending/receiving method, and an apparatus.

BACKGROUND

With development of communications technologies, a carrier frequency range of a wireless access system is also increasingly large. A high carrier frequency signal fades more seriously in free space. In other words, a path loss of the high carrier frequency signal is relatively large. Therefore, there is a coverage hole in a cell of a base station with a high carrier frequency in the wireless access system.

To meet a coverage requirement, a base station in the wireless access system needs to send a plurality of directional beams at different times in each sector, to ensure that the plurality of beams can cover the entire sector. A terminal device in the sector may simultaneously detect signals sent by one base station by using the plurality of beams.

The terminal device accesses a network when determining a frame header location of a radio frame and system information in accurate broadcast information. The broadcast information is broadcast by the base station by using a physical broadcast channel (PBCH), and the system information is a master information block (MIB).

In the foregoing multi-beam wireless access system, the base station periodically sends a corresponding synchronization signal at different time-frequency resource locations by using each beam. Apparently, time offsets of synchronization signals of different beams are different when the synchronization signals of the different beams are sent at different times. A time offset of any synchronization signal is a time offset between a time location at which the base station sends the synchronization signal in a radio frame and a frame header location of the radio frame. To reduce synchronization signal detection complexity, synchronization signals that are transmitted by the base station and that include different time offsets are the same. After receiving a synchronization signal, the terminal device cannot determine a time offset of the synchronization signal, and consequently, cannot determine the frame header location of the radio frame.

To ensure that the terminal device may determine the frame header location of the radio frame, the base station adds a time offset of broadcast information to the broadcast information when sending the broadcast information. The offset of the broadcast information is a time offset between a time location at which the base station sends the broadcast information in the radio frame and the frame header location of the radio frame. In this case, when receiving the broadcast information, the terminal device may determine the frame header location of the radio frame based on the time offset of the broadcast information and a time location at which the broadcast information is received.

There is a problem of uneven coverage in the multi-beam wireless access system. For example, a terminal device at a location A in FIG. 1 may receive two pieces of broadcast information sent by the base station by using a beam 1 and a beam 2. However, the two pieces of broadcast information are different because the two pieces of broadcast information include different time offset information, and the terminal device cannot perform joint decoding on the received two pieces of broadcast information to obtain accurate broadcast information. Consequently, the terminal device cannot access the network.

SUMMARY

This application provides a physical broadcast channel sending/receiving method and an apparatus, to resolve a prior-art problem that in a multi-beam wireless access system, when receiving broadcast information of a plurality of beams, a terminal device cannot perform joint decoding to obtain accurate broadcast information, and consequently, the terminal device cannot access a network when the terminal device is relatively far away from a base station.

Specific technical solutions provided in this application are as follows:

According to a first aspect, an embodiment of this application provides a physical broadcast channel sending method, where the method is applied to a multi-beam wireless access system, and includes: sending, by a base station, at least two physical broadcast channels on at least two time-frequency resource locations in a radio frame, and sending indication information for the at least two physical broadcast channels, where one time-frequency resource location is corresponding to one physical broadcast channel, the physical broadcast channel carries broadcast information, the broadcast information includes a time offset of a time-frequency resource location corresponding to the physical broadcast channel, the time offset of the time-frequency resource location corresponding to the physical broadcast channel is information about a time interval between a time location of the time-frequency resource location corresponding to the physical broadcast channel in time domain and a frame header location of the radio frame, the indication information is used to notify a terminal device that information other than time offsets of the time-frequency resource locations is the same in broadcast information carried on the at least two physical broadcast channels.

By using the foregoing method, the base station sends the at least two physical broadcast channels on the at least two time-frequency resource locations in the radio frame, and sends the indication information for the at least two physical broadcast channels. In this case, after receiving broadcast channel signals on two physical broadcast channels, the terminal device may determine, based on indication information of the two physical broadcast channels, that information other than time offsets of time-frequency resource locations is the same in broadcast information carried in the two broadcast channel signals, to further implement joint decoding on the two broadcast channel signals, and obtain broadcast information carried in one of the broadcast channel signals.

In a possible design, the base station sends the indication information for the at least two physical broadcast channels in the following manner:

The base station sends at least two synchronization signals. Any synchronization signal is corresponding to at least one of the at least two physical broadcast channels, and synchronization signal sequences carried in the at least two synchronization signals include the indication information of the at least two physical broadcast channels.

By using the foregoing method, the base station sends indication information of a physical broadcast channel by using a synchronization signal, to avoid increasing signaling interaction between the base station and the terminal device.

In a possible design, the indication information is the synchronization signal sequences carried in the at least two synchronization signals.

Using the foregoing method can avoid adding a synchronization signal sequence of the synchronization signal, and avoid increasing overheads of transmitting the synchronization signal by the base station.

In a possible design, a difference (namely, a time offset difference between the foregoing two time-frequency resource locations in time domain, which is a time difference in essence) between a time offset of any one of the at least two time-frequency resource locations and a time offset of another time-frequency resource location is corresponding to one unique difference sequence.

By using the foregoing method, the terminal device may determine a difference sequence based on the time offset difference of two time-frequency resource locations in time domain, to further obtain a scrambling sequence based on the difference sequence.

In a possible design, there is a linear relationship between the difference sequence and bit sequences of the time offsets of the foregoing two time-frequency resource locations. The bit sequences of the time offsets of the foregoing two time-frequency resource locations are bit sequences in broadcast information carried on the physical broadcast channels at the foregoing two time-frequency resource locations.

In a possible design, the base station sends the at least two physical broadcast channels on the at least two time-frequency resource locations in the following steps:

The base station performs, in a same manner, addition of a cyclic redundancy check CRC code, channel coding, scrambling, and modulation on the broadcast information carried on the at least two physical broadcast channels, to generate at least two corresponding broadcast channel signals. Then the base station sends, on each of the at least two physical broadcast channels, a broadcast channel signal corresponding to broadcast information carried on the physical broadcast channel.

By using the foregoing method, the base station may convert the broadcast information into a broadcast channel signal that may be sent by using a physical broadcast channel.

According to a second aspect, an embodiment of this application provides a physical broadcast channel receiving method, where the method is applied to a multi-beam wireless access system, and includes the following steps: receiving, by a terminal device, a first broadcast channel signal on a corresponding first physical broadcast channel at a first time-frequency resource location in a radio frame, and receiving a second broadcast channel signal on a corresponding second physical broadcast channel at a second time-frequency resource location, where the first broadcast channel signal carries first broadcast information, the first broadcast information includes a time offset of the first time-frequency resource location, the second broadcast channel signal carries second broadcast information, the second broadcast information includes a time offset of the second time-frequency resource location, and a time offset of any time-frequency resource location is information about a time interval between a time location of the time-frequency resource location in time domain and a frame header location of the radio frame. The method further includes: determining, by the terminal device, that first information in the first broadcast information is the same as second information in the second broadcast information, where the first information is information other than the time offset of the first time-frequency resource location in the first broadcast information, and the second information is information other than the time offset of the second time-frequency resource location in the second broadcast information. The method also includes determining, by the terminal device, a time offset difference between the first time-frequency resource location and the second time-frequency resource location in time domain, obtaining a difference sequence corresponding to the time offset difference based on a correspondence between a time offset difference and a difference sequence, and generating a scrambling sequence based on the difference sequence, where one time offset difference is corresponding to one unique difference sequence in the correspondence between a time offset difference and a difference sequence; and descrambling, by the terminal device, the first broadcast channel signal based on the scrambling sequence, descrambling the second broadcast channel signal based on a preset second scrambling sequence of the second broadcast channel signal, and performing joint decoding on the descrambled first broadcast channel signal and the descrambled second broadcast channel signal, to obtain the second broadcast information.

By using the foregoing method, the terminal device may obtain accurate broadcast information, determine the frame header location of the radio frame based on a time offset of a time-frequency resource location included in the broadcast information, and access a network based on the obtained accurate frame header location of the radio frame and each piece of information (such as system information) carried in the broadcast information.

In a possible design, the terminal device may determine, in the following two manners, that the first information is the same as the second information:

Manner 1: The terminal device obtains indication information of the first physical broadcast channel and the second physical broadcast channel, and determines, based on the indication information, that the first information is the same as the second information.

Manner 2: The terminal device determines a first scrambling sequence of the first broadcast channel signal and the second scrambling sequence of the second broadcast channel signal from a plurality of preset scrambling sequences, and determines, based on the first scrambling sequence and the second scrambling sequence, that the first information is the same as the second information.

By using the foregoing manners, subsequently the terminal device may separately descramble the two broadcast channel signals only after determining that the first information is the same as the second information, and perform joint decoding on the two descrambled broadcast channel signals, to obtain broadcast information carried in one of the broadcast channel signals.

In a possible design, the terminal device obtains the indication information by using the following method:

The terminal device receives a first synchronization signal corresponding to the first physical broadcast channel and a second synchronization signal corresponding to the second physical broadcast channel, and obtains the indication information included in synchronization signal sequences carried in the first synchronization signal and the second synchronization signal.

By using the foregoing method, the terminal device receives, by using a synchronization signal, indication information that is of a physical broadcast channel and that is sent by a base station, to avoid increasing signaling interaction between the base station and the terminal device.

In a possible design, the indication information is the synchronization signal sequences carried in the first synchronization signal and the second synchronization signal.

Using the foregoing method can avoid adding synchronization signal sequences of the foregoing two synchronization signals, and avoid increasing overheads of transmitting the synchronization signals by the base station.

In a possible design, when determining that the indication information is a specified sequence, the terminal device determines that the first information is the same as the second information.

In a possible design, when determining that a synchronization signal sequence carried in the first synchronization signal is the same as a synchronization signal sequence carried in the second synchronization signal in the indication information, the terminal device determines that the first information is the same as the second information.

In a possible design, that the terminal device determines, based on the first scrambling sequence and the second scrambling sequence, that the first information is the same as the second information includes: when determining that the first scrambling sequence is the same as the second scrambling sequence, determining, by the terminal device, that the first information is the same as the second information.

In a possible design, the terminal device generates the scrambling sequence based on the difference sequence by using the following step:

The terminal device adds a sequence to the difference sequence, so that a bit sequence length of a difference sequence obtained after the sequence is added is the same as a bit sequence length of the first broadcast information carried in the first broadcast channel signal; then performs processing such as addition of a CRC and channel coding on the difference sequence obtained after the sequence is added, and generates the scrambling sequence with reference to the processed sequence and the preset first scrambling sequence of the first broadcast channel signal.

By using the foregoing method, the terminal device may descramble the first broadcast channel signal based on the scrambling sequence, so that when information carried in the descrambled first broadcast channel signal is the same as information carried in the second broadcast channel signal descrambled by using the preset second scrambling sequence, joint decoding is implemented to obtain the second broadcast information.

In a possible design, after the terminal device obtains the second broadcast information, the terminal device obtains the time offset of the second time-frequency resource location included in the second broadcast information.

The terminal device determines the frame header location of the radio frame based on a time location of the second time-frequency resource location in time domain and the obtained time offset of the second time-frequency resource location.

By using the foregoing step, the terminal device may obtain the accurate frame header location of the radio frame, to access the network.

In a possible design, the terminal device determines the frame header location of the radio frame by using the following method:

The terminal device subtracts the time offset of the second time-frequency resource location from the time location (a time location at which the second broadcast channel signal is received) of the second time-frequency resource location in time domain, to obtain the frame header location of the radio frame.

By using the foregoing method, the terminal device may obtain the accurate frame header location of the radio frame.

According to a third aspect, an embodiment of this application further provides a base station, and the base station has a function of implementing base station behavior in the foregoing method designs. The function may be implemented by hardware, or may be implemented by hardware by executing corresponding software. The hardware or the software includes one or more modules corresponding to the foregoing function.

In a possible design, a structure of the base station includes a processing unit and a sending unit, and the units may perform corresponding functions in the foregoing method designs. For details, refer to detailed descriptions in the method designs. Details are not described herein again.

In a possible design, a structure of the base station includes a transceiver, a processor, a bus, and a memory, the transceiver is configured to perform communication interaction with another device in a multi-beam wireless access system, and the processor is configured to support the base station in performing a corresponding function in the foregoing method. The memory is coupled to the processor, and the memory stores a program instruction and data that are necessary for the base station.

According to a fourth aspect, an embodiment of this application further provides a terminal device, and the terminal device has a function of implementing terminal device behavior in the foregoing method designs. The function may be implemented by hardware, or may be implemented by hardware by executing corresponding software. The hardware or the software includes one or more modules corresponding to the foregoing function.

In a possible design, a structure of the terminal device includes a receiving unit and a processing unit, and the units may perform corresponding functions in the foregoing method designs. For details, refer to detailed descriptions in the method designs. Details are not described herein again.

In a possible design, a structure of the terminal device includes a transceiver, a processor, a bus, and a memory, the transceiver is configured to perform communication interaction with another device in a multi-beam wireless access system, and the processor is configured to support the terminal device in performing a corresponding function in the foregoing method. The memory is coupled to the processor, and the memory stores a program instruction and data that are necessary for the terminal device.

According to a fifth aspect, an embodiment of this application provides a multi-beam wireless access system, and the multi-beam wireless access system includes a base station and a terminal device.

By using the physical broadcast channel sending/receiving method provided in this application, the base station in the multi-beam wireless access system sends the at least two physical broadcast channels on the at least two time-frequency resource locations in the radio frame; and the terminal device respectively receives the first broadcast channel signal on the corresponding first physical broadcast channel and the second broadcast channel signal at the first time-frequency resource location and the second time-frequency resource location in the at least two time-frequency resource locations. Any broadcast channel signal carries broadcast information, and the broadcast information includes a time offset of a corresponding time-frequency resource location. After determining that the first information (namely, the information other than the time offset of the first time-frequency resource location) in the first broadcast information is the same as the second information (namely, the information other than the time offset of the second time-frequency resource location) in the second broadcast information, the terminal device determines the time offset difference between the foregoing two time-frequency resource locations, and generates the scrambling sequence based on the time offset difference. The terminal device may descramble the first broadcast channel signal based on the scrambling sequence, and implement joint decoding on the descrambled first broadcast channel signal and the second broadcast channel signal descrambled based on the preset second scrambling sequence, to obtain the second broadcast information. In this case, the terminal device may obtain accurate broadcast information, may determine the frame header location of the radio frame based on a time offset of a time-frequency resource location included in the broadcast information, and access a network based on the obtained accurate frame header location of the radio frame and each piece of information (such as system information) carried in the broadcast information.

BRIEF DESCRIPTION OF THE DRAWINGS

FIG. 3 is a flowchart of a physical broadcast channel sending method according to an embodiment of this application;

FIG. 5 is a flowchart of a physical broadcast channel receiving method according to an embodiment of this application;

FIG. 7A and FIG. 7B are an example diagram of a physical broadcast channel transmission method according to an embodiment of this application;

FIG. 8A and FIG. 8B are an example diagram of another physical broadcast channel transmission method according to an embodiment of this application;

DETAILED DESCRIPTION OF ILLUSTRATIVE EMBODIMENTS

Figure 1:
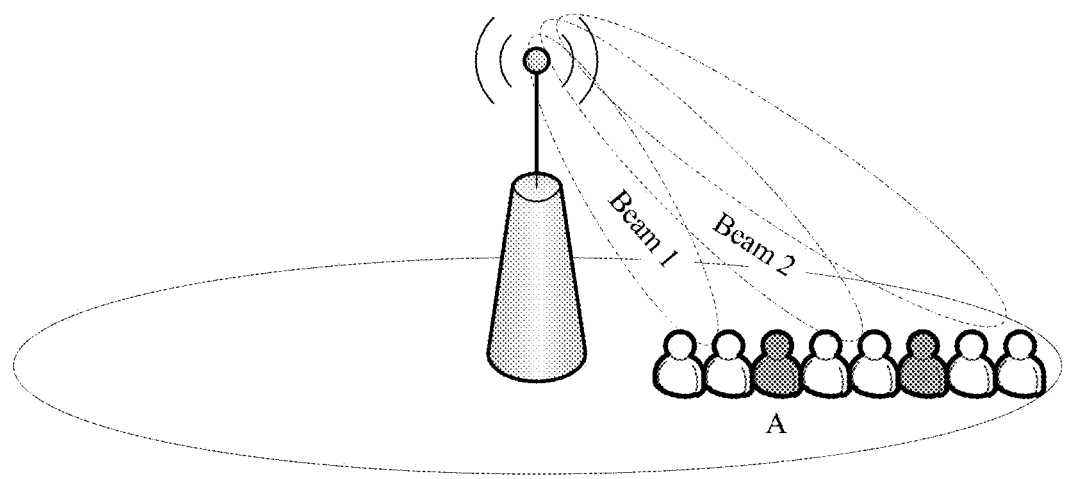
FIG. 1 is a schematic diagram of broadcast information transmission according to the prior art.

To make the objectives, technical solutions, and advantages of this application clearer, the following further describes this application in detail with reference to the accompanying drawings. Apparently, the described embodiments are merely some rather than all of the embodiments of this application. All other embodiments obtained by persons of ordinary skill in the art based on the embodiments of this application without creative efforts shall fall within the protection scope of this application.

Embodiments of this application provide a physical broadcast channel sending/receiving method and an apparatus, to resolve a prior-art problem that in a multi-beam wireless access system, when receiving broadcast information of a plurality of beams, a terminal device cannot perform joint decoding to obtain accurate broadcast information, and consequently, the terminal device cannot access a network when the terminal device is relatively far away from a base station. The method and the apparatus in this application are based on a same inventive concept. Because the method and the apparatus have a similar principle for resolving the problem, mutual reference may be made between apparatus implementation and method implementation. No repeated description is provided.

In the embodiments of this application, a base station in a multi-beam wireless access system sends at least two physical broadcast channels on at least two time-frequency resource locations in a radio frame, and a terminal device respectively receives a first broadcast channel signal on a corresponding first physical broadcast channel and a second broadcast channel signal at a first time-frequency resource location and a second time-frequency resource location in the at least two time-frequency resource locations. Any broadcast channel signal carries broadcast information, and the broadcast information includes a time offset of a corresponding time-frequency resource location. After determining that first information (namely, information other than a time offset of the first time-frequency resource location) in first broadcast information is the same as second information (namely, information other than a time offset of the second time-frequency resource location) in second broadcast information, the terminal device determines a time offset difference between the foregoing two time-frequency resource locations, and generates a scrambling sequence based on the time offset difference. The terminal device may descramble the first broadcast channel signal based on the scrambling sequence, and implement joint decoding on the descrambled first broadcast channel signal and the second broadcast channel signal descrambled based on a preset second scrambling sequence, to obtain the second broadcast information. In this case, the terminal device may obtain accurate broadcast information, may determine a frame header location of the radio frame based on a time offset of a time-frequency resource location included in the broadcast information, and access a network based on the obtained accurate frame header location of the radio frame and each piece of information (such as system information) carried in the broadcast information.

The following explains some terms in this application to facilitate understanding by persons skilled in the art.

(1) The base station in the embodiments of this application is a device that connects the terminal device to a wireless network. The base station has a relatively large carrier frequency range, and the base station includes an antenna array including a large quantity of antenna array elements. The base station may generate a plurality of high-directivity beams (directional beams) by using the antenna array, to obtain an antenna array gain. The base station may include but is not limited to an evolved Node B (eNB), a radio network controller (RNC), a Node B (NodeB, NB), a base station controller (BSC), a base transceiver station (BTS), a home eNodeB (home evolved NodeB or Home NodeB, HNB), a baseband unit (BBU), and an access point (AP).

(2) The terminal device in the embodiments of this application is also referred to as user equipment (UE), and is a device that provides a user with voice and/or data connectivity, for example, a handheld device, a mobile phone, an in-vehicle device, a wearable device, a computing device, or a mobile station (MS) that has a wireless connection function, or another processing device connected to a wireless modem.

(3) The time offset of the time-frequency resource location in the radio frame in the embodiments of this application is information about a time interval between a time location of the time-frequency resource location in time domain and the frame header location of the radio frame. A physical expression manner of the time offset may be an absolute time (a unit is second, millisecond, microsecond, or the like), or may be a physical quantity that may represent a time interval, for example, a quantity of subframes, or a quantity of symbols (for example, orthogonal frequency division multiplexing (OFDM) symbols). This is not limited in this application. For example, an absolute time offset of a start time location that is of a time-frequency resource location corresponding to a physical broadcast channel in time domain and that is relative to the frame header location of the radio frame is two subframes and four OFDM symbols. The information about the time interval includes a value obtained by rounding down the absolute time offset, and the information about the time interval is two subframes in the foregoing case.

(4) "A plurality of" in the embodiments of this application means two or more.

(5) "And/or" in the embodiments of this application is used to describe an association relationship of associated objects, and indicates that three relationships may exist. For example, A and/or B may represent the following three cases: Only A exists, both A and B exist, and only B exists. The character "/" generally indicates an "or" relationship between the associated objects.

In addition, it should be understood that, in the description of this application, terms "first" and "second" are only used for a purpose of distinguishing between descriptions, but cannot be understood as an indication or implication of relative importance, and cannot be understood as an indication or implication of a sequence.

Figure 2:
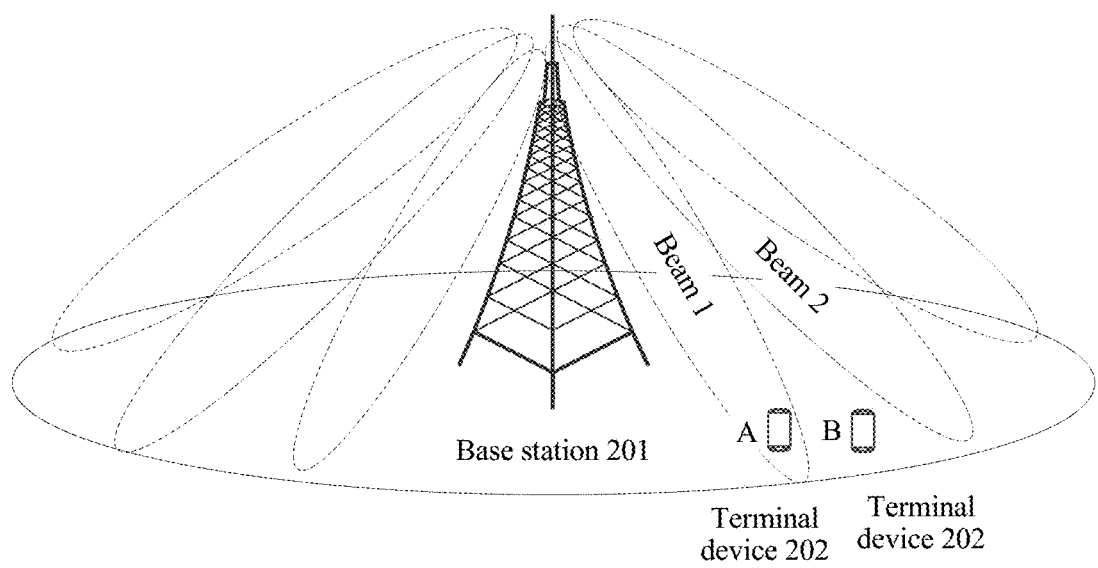
FIG. 2 is an architectural diagram of a multi-beam wireless access system according to an embodiment of this application.

To more clearly describe the technical solutions in the embodiments of this application, with reference to FIG. 2, the following describes a possible multi-beam wireless access system in the embodiments of this application. FIG. 2 shows an architecture of a possible multi-beam wireless access system according to an embodiment of this application. The multi-beam wireless access system includes a base station 201 and a terminal device 202.

The base station 201 may generate a plurality of high-gain directional beams by using an antenna array of the base station 201. Optionally, the base station 201 may send a plurality of beams in each sector of the base station 201. The base station 201 may send a physical broadcast channel on a time-frequency resource location of a radio frame and by using each beam. The physical broadcast channel carries broadcast information, and the broadcast information includes system information such as a MIB. To ensure that the terminal device may determine a frame header location of the radio frame, the broadcast information further includes a time offset of the time-frequency resource location.

The terminal device 202 is configured to: receive a broadcast channel signal on the physical broadcast channel sent by the base station, and obtain broadcast information in the broadcast channel signal. The terminal device 202 determines the frame header location of the radio frame based on the time offset of the time-frequency resource location in the broadcast information, and finally accesses a network based on the frame header location of the radio frame and the system information included in the broadcast information.

As shown in FIG. 2, there is a problem of uneven coverage in the multi-beam wireless access system. Therefore, in actual application, there are two physical broadcast channel receiving cases for the terminal device 202.

Case 1: The terminal device is located at a strong coverage location of a beam (a beam 1), for example, a location A in the figure.

The terminal device 202 receives a broadcast channel signal on a physical broadcast channel at a time-frequency resource location of the beam 1 of the radio frame, and the physical broadcast channel is sent by the base station 201 by using the beam 1.

After performing processing such as demodulation, descrambling, and decoding on the broadcast channel signal, the terminal device 202 may directly obtain broadcast information 1 carried in the broadcast channel signal.

The terminal device 202 may obtain a time offset of the time-frequency resource location included in the broadcast information 1, and obtain the frame header location of the radio frame based on a time location (a time location at which the terminal device 202 receives the physical broadcast channel) of the time-frequency resource location in time domain and the time offset of the time-frequency resource location.

Finally, the terminal device 202 may access the network based on the frame header location of the radio frame and system information included in the broadcast information 1.

Case 2: The terminal device is located in a weak coverage location of two beams (a beam 1 and a beam 2), for example, a location B in the figure. In this case, after performing processing such as demodulation, descrambling, and decoding on the broadcast information in the case 1, the terminal device cannot obtain accurate broadcast information carried in the broadcast channel signal.

The terminal device 202 receives a broadcast channel signal 1 on a corresponding physical broadcast channel 1 at a time-frequency resource location 1 of the radio frame, and the physical broadcast channel 1 is sent by the base station 201 by using the beam 1.

The terminal device 202 receives a broadcast channel signal 2 on a corresponding physical broadcast channel 2 at a time-frequency resource location 2 of the radio frame, and the physical broadcast channel 2 is sent by the base station 201 by using the beam 2.

When the terminal device 202 determines that information other than corresponding time-frequency resource locations is the same in broadcast information 1 and broadcast information 2 that are respectively carried in the broadcast channel signal 1 and the broadcast channel signal 2, the terminal device generates a scrambling sequence of the broadcast channel signal 1 and/or a scrambling sequence of the broadcast channel signal 2. Details are as follows.

The terminal device 202 determines a time offset difference between the time-frequency resource location 1 and the time-frequency resource location 2, and determines a difference sequence corresponding to the time offset difference based on a stored correspondence between a time offset difference (a time difference) and a difference sequence.

The terminal device 202 generates a scrambling sequence based on the difference sequence.

The terminal device 202 descrambles the broadcast channel signal 1, and descrambles the broadcast channel signal 2 by using a preset scrambling sequence.

The terminal device 202 performs joint decoding on the two descrambled broadcast channel signals, to generate the broadcast information 2.

The terminal device 202 may obtain a time offset of the time-frequency resource location 2 included in the broadcast information 2, and obtain the frame header location of the radio frame based on a time location (a time location at which the terminal device 202 receives the physical broadcast channel 2) of the time-frequency resource location 2 in time domain and the time offset of the time-frequency resource location 2.

Finally, the terminal device 202 may access the network based on the frame header location of the radio frame and system information included in the broadcast information 2.

The terminal device 202 may generate the broadcast information 1 based on a same principle. For a specific method step, refer to the foregoing steps. Details are not described herein again.

By using the foregoing steps, the terminal device 202 may separately descramble two broadcast channel signals when the time offsets of the time-frequency resource locations carried in the two broadcast channel signals are different, and other information is the same, to implement joint decoding on the two broadcast channel signals, obtain system information and a time offset of a time-frequency resource location in any of the broadcast channel signals, and obtain the frame header location of the radio frame based on the obtained time offset of the time-frequency resource location. Finally, the terminal device 202 may access the network based on the frame header location of the radio frame and the obtained system information in the broadcast information.

Referring to FIG. 3, an embodiment of this application provides a physical broadcast channel sending method, and the method is applied to the multi-beam wireless access system shown in FIG. 2. A processing procedure of the method includes the following steps.

Step 301: A base station sends at least two physical broadcast channels on at least two time-frequency resource locations in a radio frame, where one time-frequency resource location is corresponding to one physical broadcast channel, the physical broadcast channel carries broadcast information, the broadcast information includes a time offset of a time-frequency resource location corresponding to the physical broadcast channel, the time offset of the time-frequency resource location corresponding to the physical broadcast channel is information about a time interval between a time location of the time-frequency resource location corresponding to the physical broadcast channel in time domain and a frame header location of the radio frame, and time offsets of the time-frequency resource locations included in broadcast information carried on the at least two physical broadcast channels are different.

Because the base station sends a physical broadcast channel by using a beam, a quantity of physical broadcast channels sent by the base station is the same as a quantity of beams generated by the base station. Because time-frequency resource locations are in a one-to-one correspondence with physical broadcast channels, a quantity of physical broadcast channels sent by the base station is the same as a quantity of time-frequency resource locations in one radio frame that are occupied when the base station sends the physical broadcast channels.

Figure 4:
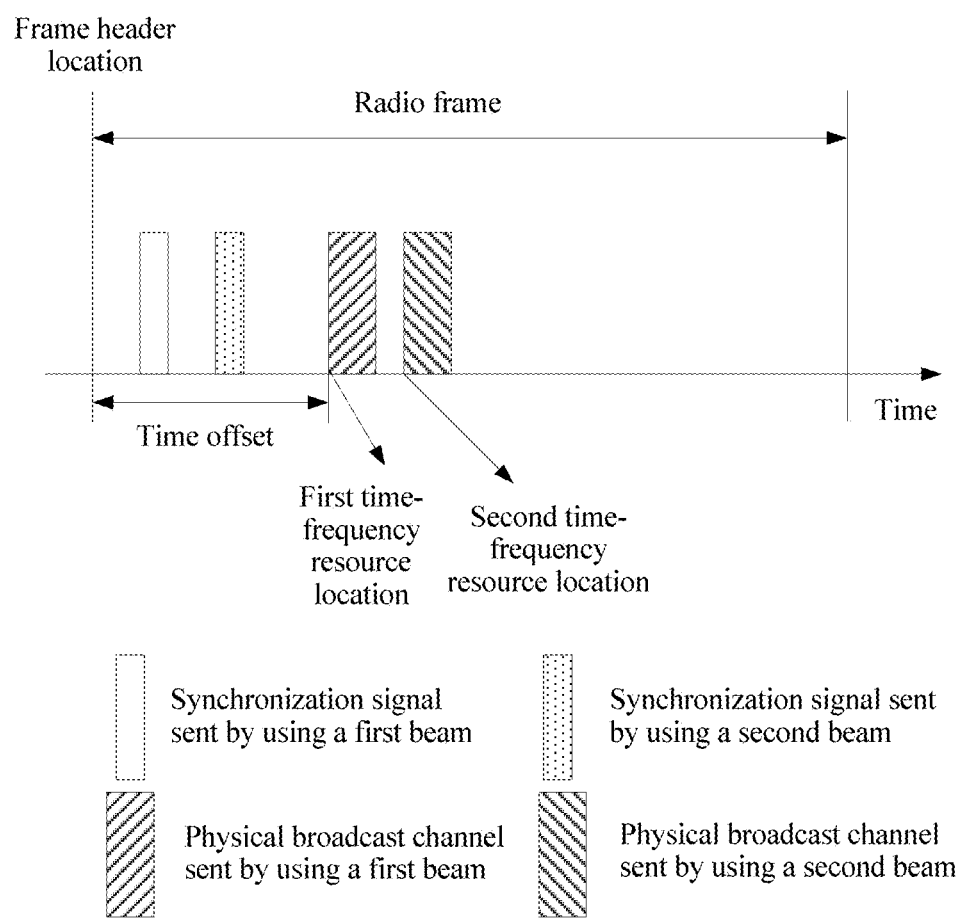
FIG. 4 is a schematic diagram of sending a physical broadcast channel by a base station according to an embodiment of this application.

For example, when a plurality of beams generated by the base station include a first beam and a second beam, referring to FIG. 4, the base station sends a physical broadcast channel at a first time-frequency resource location by using the first beam, and the base station sends a physical broadcast channel at a second time-frequency resource location by using the second beam.

A terminal device cannot determine the frame header location of the radio frame based on a received synchronization signal. To ensure that the terminal device may accurately determine the frame header location of the radio frame, broadcast information carried on each physical broadcast channel sent by the base station includes a time offset of a time-frequency resource location occupied by the physical broadcast channel. In this case, after receiving a broadcast channel signal of a physical broadcast channel, the terminal device may determine the frame header location of the radio frame by using a time offset of a time-frequency resource location occupied by the physical broadcast channel. FIG. 4 is still used as an example. Broadcast information carried on the physical broadcast channel sent by the base station at the first time-frequency resource location includes a time offset of the first time-frequency resource location.

Conventional broadcast information includes system information, and a bit sequence length of the conventional broadcast information is L. In this embodiment of this application, the broadcast information includes the time offset of the time-frequency resource location. Therefore, a bit sequence length of the broadcast information is L+M, and M is a bit sequence length of the time offset of the time-frequency resource location.

Optionally, in the broadcast information, a bit sequence of the time offset of the time-frequency resource location may be at a start location or an end location of the bit sequence of the broadcast information, or at a specified location of a bit sequence of the broadcast information. This is not limited in this application.

Specifically, when the base station performs step 301, the following steps are included:

The base station performs addition of a cyclic redundancy check (CRC) code, channel coding, scrambling, and modulation in a same manner on the broadcast information carried on the at least two physical broadcast channels, to generate at least two corresponding broadcast channel signals.

The base station sends, on each of the at least two physical broadcast channels, a broadcast channel signal corresponding to broadcast information carried on the physical broadcast channel.

An implementation in which the base station adds the CRC includes: adding, to an existing bit sequence whose length is L, K check bits used to check the bit sequence, and finally generating a bit sequence whose length is L+M+K. The K check bits are generated based on the bit sequence whose length is L.

An implementation in which the base station performs channel coding includes a tail biting convolutional code in a Long Term Evolution (LTE) technology.

An implementation in which the base station performs modulation includes quadrature phase shift keying (QPSK) modulation.

The base station scrambles a plurality of pieces of broadcast information by using a plurality of preset scrambling sequences.

Step 302: The base station sends indication information for the at least two physical broadcast channels, where the indication information is used to notify a terminal device that information other than the time offsets of the time-frequency resource locations is the same in the broadcast information carried on the at least two physical broadcast channels.

The indication information may be further used to notify the terminal device that information other than time offsets of time-frequency resource locations is different in broadcast information carried on received two physical broadcast channels.

The physical broadcast channels are in a one-to-one correspondence with the time-frequency resource locations. Therefore, when the base station sends a plurality of physical broadcast channels, time offsets of time-frequency resource locations in broadcast information carried on any two physical broadcast channels are different. However, information (such as system information) other than time offsets may be the same in broadcast information carried on some of the physical broadcast channels.

When broadcast information carried on two physical broadcast channels is located in a same time unit, information other than time offsets is the same in the broadcast information carried on the two physical broadcast channels. For example, the broadcast information includes information related to the radio frame, and the information related to the radio frame remains unchanged in a period of 40 ms. However, the information related to the radio frame changes at an interval of 40 ms. In this case, information other than time offsets in broadcast information in one time unit (a period of 40 ms) is the same, and information other than time offsets in broadcast information in different time units is different.

The terminal device may receive broadcast channel signals of a plurality of physical broadcast channels at a weak coverage location. To obtain accurate broadcast information, the terminal device needs to perform joint decoding (to be specific, perform soft combination processing on the plurality of broadcast channel signals) on broadcast channel signals carrying broadcast information including same information. For example, joint decoding may be implemented by using a chase combining method or another method. A joint decoding method is not limited in this embodiment of this application. It may be obtained from the foregoing description that, to ensure that after receiving the broadcast channel signals of the plurality of physical broadcast channels, the terminal device at the weak coverage location may perform joint decoding on the plurality of received broadcast channel signals, to obtain accurate broadcast information carried in one of the broadcast channel signals, the terminal device needs to determine that broadcast information carried in the plurality of received broadcast channel signals includes same information. Optionally, the terminal device determines the foregoing case by using the indication information of the physical broadcast channels that is sent by the base station.

Optionally, that the base station sends indication information for the at least two physical broadcast channels includes:
sending, by the base station, at least two synchronization signals, where any synchronization signal is corresponding to at least one of the at least two physical broadcast channels, and synchronization signal sequences carried in the at least two synchronization signals include the indication information of the at least two physical broadcast channels.

FIG. 4 is still used as an example. Indication information of the physical broadcast channel sent by using the first beam and indication information of the physical broadcast channel sent by using the second beam may be included in a synchronization sequence sent by using the first beam and/or a synchronization sequence sent by using the second beam.

By using the foregoing method, the base station sends indication information of a physical broadcast channel by using a synchronization signal, to avoid increasing signaling interaction between the base station and the terminal device.

Optionally, the indication information is synchronization signal sequences carried in the at least two synchronization signals.

Using the foregoing manner can avoid adding a synchronization signal sequence of the synchronization signal, and avoid increasing overheads of transmitting the synchronization signal by the base station.

When synchronization signal sequences of synchronization signals of two physical broadcast channels sent by the base station are the same, indication information (namely, the synchronization signal sequences of the two synchronization signals) of the two physical broadcast channels may be used to notify the terminal device that information other than time offsets of time-frequency resource locations is the same in broadcast information carried in broadcast channel signals on the two physical broadcast channels. Because the foregoing two synchronization signals further include information indicating a serving cell identifier of the terminal device, information about serving cell identifiers carried in the foregoing two synchronization signals is also the same.

Optionally, a difference (namely, a time offset difference between the foregoing two time-frequency resource locations in time domain, which is a time difference in essence) between a time offset of any one of the at least two time-frequency resource locations and a time offset of another time-frequency resource location is corresponding to one unique difference sequence. However, a same difference sequence may be corresponding to one or more time differences.

For example, a difference (a time difference) between a time offset of a time-frequency resource location 1 and a time offset of a time-frequency resource location 2 includes the following possible cases: {one subframe, two subframes, three subframes}.

When different time differences each are corresponding to a unique difference sequence, a correspondence between a time difference and a difference sequence is shown in Table 1.

TABLE 1

Correspondence between a time difference and a difference sequence

| Time difference | Difference sequence |
| --- | --- |
| One subframe | {01} |
| Two subframes | {10} |
| Three subframes | {11} |

When a same difference sequence may be corresponding to a plurality of time differences, a correspondence between a time difference and a difference sequence is shown in Table 2.

TABLE 2

Correspondence between a time difference
and a difference sequence

| Time difference | Difference sequence |
| --- | --- |
| One subframe | {01} |
| Two subframes | {01} |
| Three subframes | {11} |

Optionally, there is a linear relationship between the difference sequence and bit sequences of the time offsets of the foregoing two time-frequency resource locations. The bit sequences of the time offsets of the foregoing two time-frequency resource locations are bit sequences in broadcast information carried on the physical broadcast channels at the foregoing two time-frequency resource locations.

The difference sequence is used to generate a scrambling sequence. When the terminal device determines that information other than time offsets of time-frequency resource locations is the same in first broadcast information carried in a received first broadcast channel signal and second broadcast information carried in a received second broadcast channel signal, the terminal device may determine a difference sequence by using a time offset difference between a first time-frequency resource location at which the first broadcast channel signal is received and a second time-frequency resource location at which the second broadcast channel signal is received in time domain, and obtain a scrambling sequence by using the difference sequence. Finally, the terminal device may descramble the first broadcast channel signal, so that information carried in the descrambled first broadcast channel signal is the same as information carried in the second broadcast channel signal descrambled by using a preset second scrambling sequence, to implement joint decoding, and obtain the second broadcast information.

It can be learned from the foregoing description that the terminal device maintains a correspondence between a time difference and a difference sequence, so that a corresponding difference sequence may be obtained based on a time offset difference between two time-frequency resource locations in time domain, and a scrambling sequence may be obtained.

By using the physical broadcast channel sending method in the foregoing embodiment of this application, the base station sends the at least two physical broadcast channels on the at least two time-frequency resource locations in the radio frame, and sends the indication information for the at least two physical broadcast channels. In this case, after receiving broadcast channel signals on two physical broadcast channels, the terminal device may determine, based on indication information of the two physical broadcast channels, that information other than time offsets of time-frequency resource locations is the same in broadcast information carried in the two broadcast channel signals, to further implement joint decoding on the two broadcast channel signals, and obtain broadcast information carried in one of the broadcast channel signals.

This application further provides a physical broadcast channel receiving method, and the method is applied to the multi-beam wireless access system shown in FIG. 2. A terminal device is in a weak coverage location (a location B in FIG. 2). Referring to FIG. 5, a processing procedure of the method includes the following steps.

Step 501: The terminal device receives a first broadcast channel signal on a corresponding first physical broadcast channel at a first time-frequency resource location in a radio frame, and receives a second broadcast channel signal on a corresponding second physical broadcast channel at a second time-frequency resource location, where the first broadcast channel signal carries first broadcast information, the first broadcast information includes a time offset of the first time-frequency resource location, the second broadcast channel signal carries second broadcast information, the second broadcast information includes a time offset of the second time-frequency resource location, and a time offset of any time-frequency resource location is information about a time interval between a time location of the time-frequency resource location in time domain and a frame header location of the radio frame.

Because the terminal device is in the weak coverage location, when a base station sends a plurality of physical broadcast channels on a plurality of time-frequency resource locations in the radio frame, the terminal device may receive broadcast channel signals of the plurality of physical broadcast channels sent by the base station. In this embodiment of this application, an example in which the terminal device receives broadcast channel signals of two physical broadcast channels is only used for description.

Step 502: The terminal device determines that first information in the first broadcast information is the same as second information in the second broadcast information, where the first information is information other than the time offset of the first time-frequency resource location in the first broadcast information, and the second information is information other than the time offset of the second time-frequency resource location in the second broadcast information.

After performing step 502, the terminal device may separately descramble the two broadcast channel signals subsequently, and perform joint decoding on the two descrambled broadcast channel signals, to obtain broadcast information carried in one of the broadcast channel signals.

Optionally, the terminal device may determine, in the following two manners, that the first information is the same as the second information:

Manner 1: When the base station in the multi-beam wireless access system sends indication information for the first physical broadcast channel and the second physical broadcast channel by using the method in this embodiment shown in FIG. 3, the terminal device obtains the indication information of the first physical broadcast channel and the second physical broadcast channel, and determines, based on the indication information, that the first information is the same as the second information.

Manner 2: When the base station in the multi-beam wireless access system indicates, by using a preset scrambling sequence used to scramble the first physical broadcast channel and the second physical broadcast channel, that the first information is the same as the second information, the terminal device determines a first scrambling sequence of the first broadcast channel signal and a second scrambling sequence of the second broadcast channel signal from a plurality of preset scrambling sequences, and determines, based on the first scrambling sequence and the second scrambling sequence, that the first information is the same as the second information. The plurality of preset scrambling sequences stored by the terminal device are scrambling sequences used by the base station to scramble the plurality of physical broadcast channels.

Optionally, the base station notifies the terminal device when the base station uses one of the foregoing indication manners (performs indication by using a synchronization signal or by using a scrambling sequence), so that the terminal device may determine, in the foregoing corresponding manners, that the first information is the same as the second information.

Optionally, in the manner 1, that the terminal device obtains the indication information includes: receiving, by the terminal device, a first synchronization signal corresponding to the first physical broadcast channel and a second synchronization signal corresponding to the second physical broadcast channel, and obtaining the indication information included in synchronization signal sequences carried in the first synchronization signal and the second synchronization signal.

Optionally, that the terminal device determines, based on the indication information, that the first information is the same as the second information includes: when determining that the indication information is a specified sequence, determining, by the terminal device, that the first information is the same as the second information.

Optionally, the indication information is the synchronization signal sequences carried in the first synchronization signal and the second synchronization signal; and that the terminal device determines, based on the indication information, that the first information is the same as the second information includes: when determining that a synchronization signal sequence carried in the first synchronization signal is the same as a synchronization signal sequence carried in the second synchronization signal in the indication information, determining, by the terminal device, that the first information is the same as the second information.

Optionally, in the manner 2, that the terminal device determines, based on the first scrambling sequence and the second scrambling sequence, that the first information is the same as the second information includes: when determining that the first scrambling sequence is the same as the second scrambling sequence, determining, by the terminal device, that the first information is the same as the second information.

It should be noted that an execution sequence of step 502 and step 501 is not limited in this embodiment of this application. For example, when the terminal device determines, in the manner 1, that the first information is the same as the second information, because the terminal device first receives a synchronization signal and then receives a broadcast channel signal on a physical broadcast channel (as shown in FIG. 4), the terminal device may perform step 502 before step 501. When the terminal device determines, in the manner 2, that the first information is the same as the second information, the terminal device may perform step 501 before step 502.

Step 503: The terminal device determines a time offset difference between the first time-frequency resource location and the second time-frequency resource location in time domain, obtains a difference sequence corresponding to the time offset difference, and generates a scrambling sequence based on the difference sequence, where one time offset difference is corresponding to one unique difference sequence.

It can be learned from the description of the difference sequence in the embodiment shown in FIG. 3 that the terminal device maintains a correspondence between a time difference (which may also be referred to as a time offset difference) and a difference sequence, so that after the time offset difference between the first time-frequency resource location and the second time-frequency resource location in time domain is obtained, the difference sequence corresponding to the time offset difference may be obtained based on the correspondence between a time difference and a difference sequence, to generate the scrambling sequence.

Because there is a linear relationship between the difference sequence and the following two: a bit sequence of the time offset of the first time-frequency resource location in the first broadcast information and a bit sequence of the time offset of the second time-frequency resource location in the second broadcast information, optionally, a bit sequence length of the difference sequence is the same as a bit sequence length of the time offset of the first/second time-frequency resource location. Therefore, to ensure that the generated scrambling sequence may be used to descramble the first broadcast channel signal, the terminal device needs to add a sequence to the difference sequence, and a bit sequence length of the generated scrambling sequence is equal to a bit sequence length of the first broadcast information. Optionally, a location of the added sequence is determined based on a location of the bit sequence of the time offset of the first time-frequency resource location in a bit sequence of the first broadcast information. In conclusion, it needs to be ensured that a location of the original difference sequence in a difference sequence obtained after the sequence is added is the same as the location of the bit sequence of the time offset of the first time-frequency resource location in the bit sequence of the first broadcast information.

Optionally, a bit value of each added sequence is fixed, to be specific, is 0 or 1.

After generating the difference sequence (referred to as a first sequence) obtained after the sequence is added, the terminal device performs processing such as addition of a CRC and channel coding on the first sequence, and generates the scrambling sequence with reference to the processed first sequence and the preset first scrambling sequence of the first broadcast channel signal.

Step 504: The terminal device descrambles the first broadcast channel signal based on the scrambling sequence, descrambles the second broadcast channel signal based on a preset second scrambling sequence of the second broadcast channel signal, and performs joint decoding on the descrambled first broadcast channel signal and the descrambled second broadcast channel signal, to obtain the second broadcast information.

By using step 504, the terminal device may obtain the accurate second broadcast information, to ensure that the terminal device may subsequently obtain the time offset of the second time-frequency resource location included in the second broadcast information, and finally determine the frame header location of the radio frame based on the time offset of the second time-frequency resource location.

Figure 6:
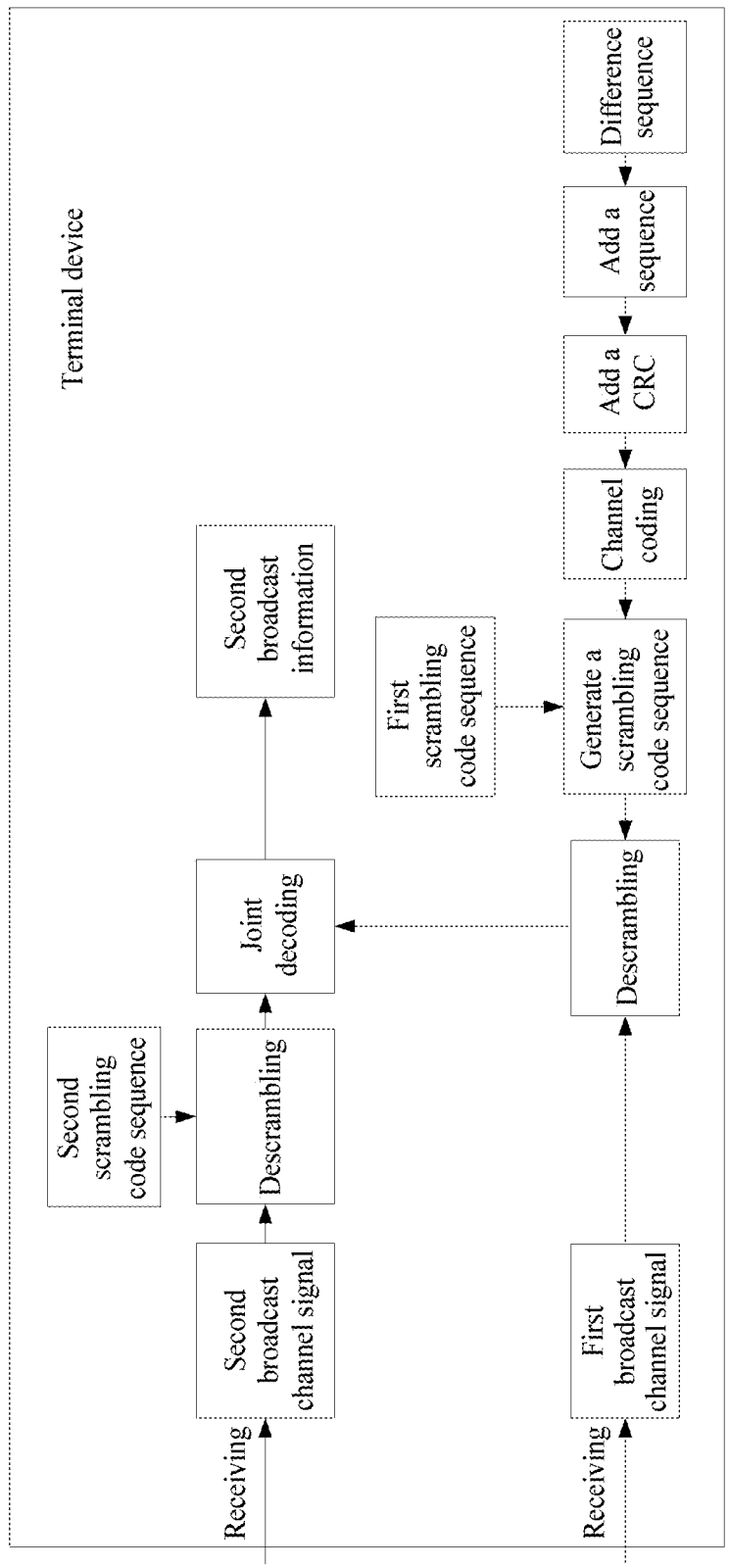
FIG. 6 is a schematic diagram of a procedure in which a terminal device obtains second broadcast information based on a difference sequence according to an embodiment of this application.

A specific procedure of performing step 503 and step 504 by the terminal device is shown in FIG. 6.

Optionally, after step 504, the terminal device obtains the time offset of the second time-frequency resource location included in the second broadcast information; and the terminal device determines the frame header location of the radio frame based on a time location of the second time-frequency resource location in time domain and the obtained time offset of the second time-frequency resource location.

That the terminal device determines the frame header location of the radio frame includes:

subtracting, by the terminal device, the time offset of the second time-frequency resource location from the time location (a time location at which the second broadcast channel signal is received) of the second time-frequency resource location in time domain, to obtain the frame header location of the radio frame.

By using the foregoing step, the terminal device may obtain the accurate frame header location of the radio frame, to access a network.

By using the physical broadcast channel receiving method provided in this embodiment of this application, the terminal device respectively receives the first broadcast channel signal on the corresponding first physical broadcast channel and the second broadcast channel signal at the first time-frequency resource location and the second time-frequency resource location in the at least two time-frequency resource locations. Any broadcast channel signal carries broadcast information, and the broadcast information includes a time offset of a corresponding time-frequency resource location. After determining that the first information (namely, the information other than the time offset of the first time-frequency resource location) in the first broadcast information is the same as the second information (namely, the information other than the time offset of the second time-frequency resource location) in the second broadcast information, the terminal device determines the time offset difference between the foregoing two time-frequency resource locations, and generates the scrambling sequence based on the time offset difference. The terminal device may descramble the first broadcast channel signal based on the scrambling sequence, and implement joint decoding on the descrambled first broadcast channel signal and the second broadcast channel signal descrambled based on the preset second scrambling sequence, to obtain the second broadcast information. In this case, the terminal device may obtain accurate broadcast information, may determine the frame header location of the radio frame based on a time offset of a time-frequency resource location included in the broadcast information, and access the network based on the obtained accurate frame header location of the radio frame and each piece of information (such as system information) carried in the broadcast information.

Figure 7A:
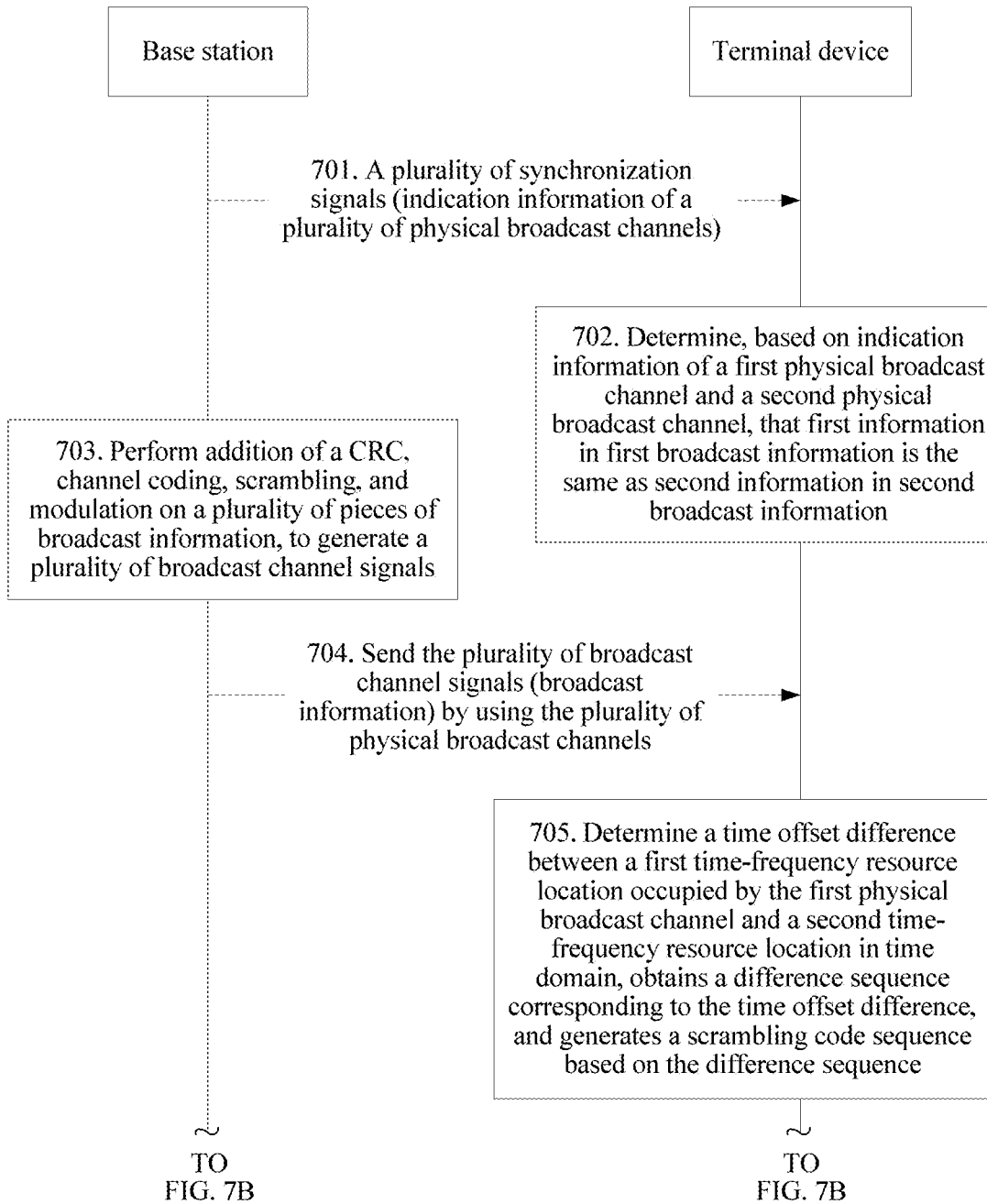

Based on the foregoing embodiments, this application further provides an example of a physical broadcast channel transmission method, and the example is applicable to the multi-beam wireless access system shown in FIG. 2. In this example, the terminal device indicates, by using a synchronization signal sent by a base station, that information other than time offsets of time-frequency resource locations is the same in broadcast information carried on at least two physical broadcast channels. Referring to FIG. 7A and FIG. 7B, a specific procedure includes the following steps.

Step 701: The base station sends, on a plurality of time-frequency resource locations in a radio frame, a plurality of synchronization signals corresponding to a plurality of physical broadcast channels, where synchronization signal sequences carried in the plurality of synchronization signals are indication information of the plurality of physical broadcast channels.

The synchronization signals are in a one-to-one correspondence with the physical broadcast channels. The indication information is used to notify the terminal device that when broadcast channel signals of at least two physical broadcast channels are received, whether information other than time offsets of time-frequency resource locations is the same in broadcast information carried in the at least two broadcast channel signals.

Synchronization signal sequences carried in synchronization signals in a specified time unit are the same, and synchronization signal sequences carried in synchronization signals in two adjacent time units are different. The time unit may be at least one subframe or at least one radio frame. For example, when the time unit is one radio frame, a synchronization signal sequence carried in a synchronization signal in an odd numbered time unit is a first synchronization signal sequence, and a synchronization signal sequence carried in a synchronization signal in an even numbered time unit is a second synchronization signal sequence. Therefore, a synchronization signal sequence carried in a synchronization signal may indicate whether a current time unit is an odd numbered time unit or an even numbered time unit. The synchronization signal sequences carried in the synchronization signals in the specified time unit are the same, and indicate that information other than time offsets of time-frequency resource locations in any two pieces of broadcast information in the odd numbered time unit or the even numbered time unit is the same.

Step 702: The terminal device receives a first synchronization signal corresponding to a first physical broadcast channel and a second synchronization signal corresponding to a second physical broadcast channel in the plurality of synchronization signals, determines that synchronization signal sequences carried in the first synchronization signal and the second synchronization signal are indication information of the first physical broadcast channel and the second physical broadcast channel, and determines, based on the indication information, that first information in first broadcast information is the same as second information in second broadcast information.

The first broadcast information is carried in a first broadcast channel signal of the first physical broadcast channel, and the second broadcast information is carried in a second broadcast channel signal of the second physical broadcast channel.

The first information is information other than a time offset of a first time-frequency resource location occupied by the first physical broadcast channel in the first broadcast information, and the second information is information other than a time offset of a second time-frequency resource location occupied by the second physical broadcast channel in the second broadcast information.

The determining, based on the indication information, that first information in first broadcast information is the same as second information in second broadcast information includes: when determining that a synchronization signal sequence carried in the first synchronization signal is the same as a synchronization signal sequence carried in the second synchronization signal in the indication information, determining, by the terminal device, that the first information is the same as the second information.

The terminal device determines, based on the synchronization signal sequences, whether a time-frequency resource location corresponding to the received first physical broadcast channel and a time-frequency resource location corresponding to the received second physical broadcast channel are located in a same time unit. If determining, based on the synchronization signal sequences, that the first physical broadcast channel and the second physical broadcast channel are located in a same time unit, the terminal device may determine that the first information is the same as the second information.

In this example, an execution sequence of step 702 is not limited, and it only needs to ensure that step 702 is performed after step 701 and before step 705.

Step 703: The base station performs addition of a CRC, channel coding, scrambling, and modulation on a plurality of pieces of broadcast information in a same manner, to generate a plurality of corresponding broadcast channel signals.

The base station scrambles the plurality of pieces of broadcast information by using a plurality of preset scrambling sequences, and sends the plurality of preset scrambling sequences to the terminal device.

Step 704: The base station sends the plurality of pieces of broadcast information on the plurality of time-frequency resource locations in the radio frame and by using the plurality of physical broadcast channels (in other words, the base station sends the plurality of physical broadcast channels). Each piece of broadcast information carries corresponding broadcast information.

Step 705: After receiving a first broadcast channel signal on the corresponding first physical broadcast channel at a first time-frequency resource location in the plurality of time-frequency resource locations, and receiving a second broadcast channel signal on the corresponding second physical broadcast channel at a second time-frequency resource location, the terminal device determines a time offset difference between the first time-frequency resource location occupied by the first physical broadcast channel and the second time-frequency resource location in time domain, obtains a difference sequence corresponding to the time offset difference, and generates a scrambling sequence based on the difference sequence.

The terminal device maintains a correspondence between a time difference and a difference sequence. Therefore, after obtaining the time offset difference, the terminal device may obtain, based on the correspondence between a time difference and a difference sequence, the difference sequence corresponding to the time offset difference, to generate the scrambling sequence.

In this example, for a specific process in which the terminal device generates the scrambling sequence based on the difference sequence, refer to the foregoing embodiment. Details are not described herein again.

Step 706: The terminal device descrambles the received first broadcast channel signal based on the scrambling sequence, and descrambles the second broadcast channel signal based on a preset second scrambling sequence of the second broadcast channel signal.

The second scrambling sequence is sent by the base station to the terminal device.

In step 706, the terminal device descrambles the first broadcast channel signal, so that when information carried in the descrambled first broadcast channel signal is the same as information carried in the second broadcast channel signal descrambled by using the preset second scrambling sequence, joint decoding is implemented to obtain the second broadcast information.

Step 707: The terminal device performs joint decoding on the descrambled first broadcast channel signal and the descrambled second broadcast channel signal, to obtain the second broadcast information.

Step 708: The terminal device obtains a time offset of the second time-frequency resource location included in the second broadcast information, and determines a frame header location of the radio frame based on a time location of the second time-frequency resource location in time domain and the time offset of the second time-frequency resource location.

The terminal device subtracts the time offset of the second time-frequency resource location from the time location (a time location at which the second broadcast channel signal is received) of the second time-frequency resource location in time domain, to obtain the frame header location of the radio frame.

Step 709: The terminal device accesses a network based on the frame header location of the radio frame and system information carried in the second broadcast information.

Figure 8A:
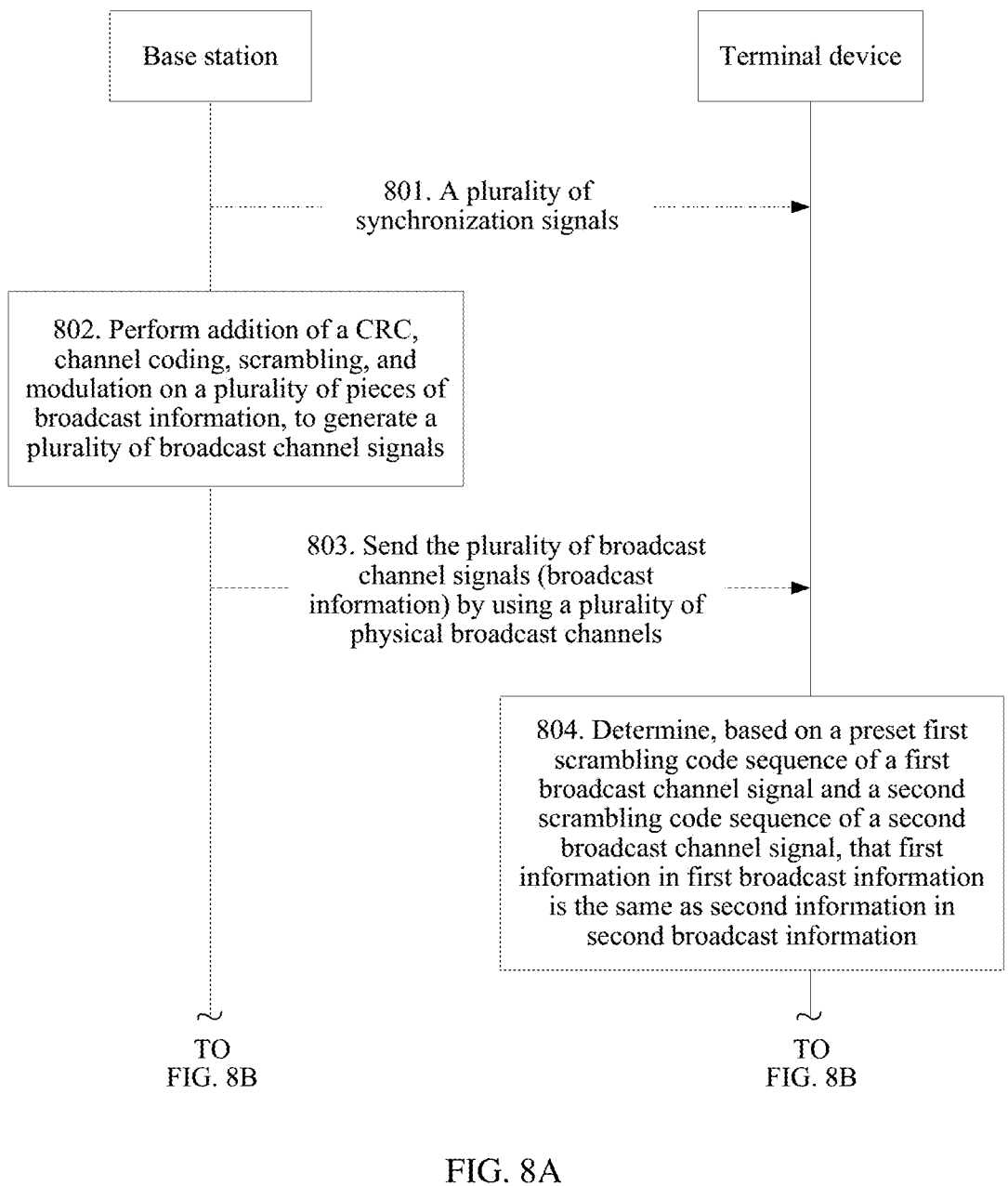

Based on the foregoing embodiments, this application further provides an example of a physical broadcast channel transmission method, and the example is applicable to the multi-beam wireless access system shown in FIG. 2. In this example, a terminal device determines, by using preset scrambling sequences of broadcast channel signals on at least two physical broadcast channels, that information other than time offsets of time-frequency resource locations is the same in broadcast information carried in the broadcast channel signals of the at least two physical broadcast channels. Referring to FIG. 8A and FIG. 8B, a specific procedure includes the following steps:

Step 801: A base station sends, on a plurality of time-frequency resource locations in a radio frame, a plurality of synchronization signals corresponding to a plurality of physical broadcast channels.

The terminal device receives a first synchronization signal corresponding to a first physical broadcast channel and a second synchronization signal corresponding to a second physical broadcast channel in the plurality of synchronization signals. The synchronization signals are in a one-to-one correspondence with the physical broadcast channels.

Step 802: The base station performs addition of a CRC, channel coding, scrambling, and modulation on a plurality of pieces of broadcast information in a same manner, to generate a plurality of corresponding broadcast channel signals.

The base station scrambles the plurality of pieces of broadcast information by using a plurality of preset scrambling sequences, and sends the plurality of preset scrambling sequences to the terminal device.

Step 803: The base station sends the plurality of pieces of broadcast information on the plurality of time-frequency resource locations in the radio frame and by using the plurality of physical broadcast channels (in other words, the base station sends the plurality of physical broadcast channels). Each piece of broadcast information carries corresponding broadcast information.

The terminal device receives a first broadcast channel signal on the corresponding first physical broadcast channel at a first time-frequency resource location in the radio frame, and receives a second broadcast channel signal on the corresponding second physical broadcast channel at a second time-frequency resource location.

The first broadcast channel signal carries first broadcast information, the first broadcast information includes a time offset of the first time-frequency resource location, the second broadcast channel signal carries second broadcast information, and the second broadcast information includes a time offset of the second time-frequency resource location.

Step 804: The base station determines a first scrambling sequence of first broadcast channel signal and second scrambling sequence of second broadcast channel signal from a plurality of preset scrambling sequences sent by the base station, and determines, based on the first scrambling sequence and the second scrambling sequence, that first information in first broadcast information is the same as second information in second broadcast information.

When determining that the first scrambling sequence is the same as the second scrambling sequence, the terminal device determines that the first information in the first broadcast information is the same as the second information in the second broadcast information.

Step 805: The terminal device determines a time offset difference between first time-frequency resource location occupied by first physical broadcast channel and second time-frequency resource location in time domain, obtains a difference sequence corresponding to the time offset difference, and generates a scrambling sequence based on the difference sequence.

The terminal device maintains a correspondence between a time difference and a difference sequence. Therefore, after obtaining the time offset difference, the terminal device may obtain, based on the correspondence between a time difference and a difference sequence, the difference sequence corresponding to the time offset difference, to generate the scrambling sequence.

In this example, for a specific process in which the terminal device generates the scrambling sequence based on the difference sequence, refer to the foregoing embodiment. Details are not described herein again.

Step 806: The terminal device descrambles the received first broadcast channel signal based on the scrambling sequence, and descrambles the second broadcast channel signal based on a preset second scrambling sequence of the second broadcast channel signal.

The second scrambling sequence is sent by the base station to the terminal device.

In step 806, the terminal device descrambles the first broadcast channel signal, so that when information carried in the descrambled first broadcast channel signal is the same as information carried in the second broadcast channel signal descrambled by using the preset second scrambling sequence, joint decoding is implemented to obtain the second broadcast information.

Step 807: The terminal device performs joint decoding on the descrambled first broadcast channel signal and the descrambled second broadcast channel signal, to obtain the second broadcast information.

Step 808: The terminal device obtains a time offset of the second time-frequency resource location included in the second broadcast information, and determines a frame header location of the radio frame based on a time location of the second time-frequency resource location in time domain and the time offset of the second time-frequency resource location.

The terminal device subtracts the time offset of the second time-frequency resource location from the time location (a time location at which the second broadcast channel signal is received) of the second time-frequency resource location in time domain, to obtain the frame header location of the radio frame.

Step 809: The terminal device accesses a network based on the frame header location of the radio frame and system information carried in the second broadcast information.

Figure 9:
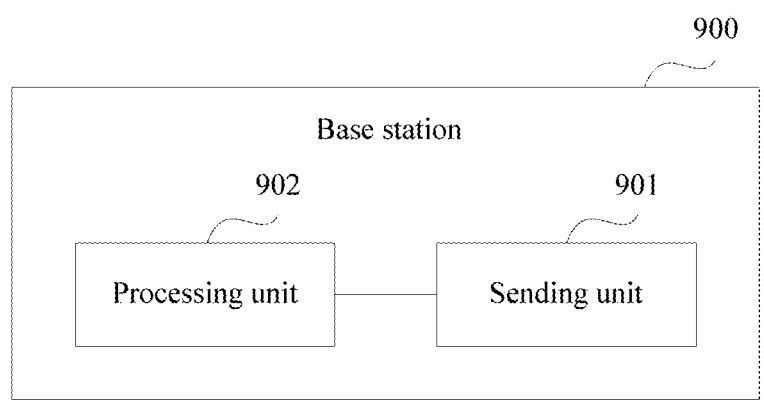
FIG. 9 is a structural diagram of a base station according to an embodiment of this application.

Based on the foregoing embodiments, an embodiment of this application provides a base station, and the base station is applied to the multi-beam wireless access system shown in FIG. 2, and is configured to implement the physical broadcast channel sending method shown in FIG. 3. As shown in FIG. 9, the base station 900 includes a sending unit 901 and a processing unit 902.

The sending unit 901 is configured to send at least two physical broadcast channels on at least two time-frequency resource locations in a radio frame. One time-frequency resource location is corresponding to one physical broadcast channel, the physical broadcast channel carries broadcast information, the broadcast information includes a time offset of a time-frequency resource location corresponding to the physical broadcast channel, the time offset of the time-frequency resource location corresponding to the physical broadcast channel is information about a time interval between a time location of the time-frequency resource location corresponding to the physical broadcast channel in time domain and a frame header location of the radio frame, and time offsets of the time-frequency resource locations included in broadcast information carried on the at least two physical broadcast channels are different.

The processing unit 902 is configured to generate indication information for the at least two physical broadcast channels. The indication information is used to notify a terminal device that information other than the time offsets of the time-frequency resource locations is the same in the broadcast information carried on the at least two physical broadcast channels.

The sending unit 901 is further configured to send the indication information.

Optionally, the sending unit 901 is further configured to: send at least two synchronization signals, where any synchronization signal is corresponding to at least one of the at least two physical broadcast channels, and synchronization signal sequences carried in the at least two synchronization signals include the indication information of the at least two physical broadcast channels.

Optionally, the indication information is the synchronization signal sequences carried in the at least two synchronization signals.

Optionally, a difference between a time offset of any one of the at least two time-frequency resource locations and a time offset of another time-frequency resource location is corresponding to one unique difference sequence.

Optionally, the processing unit 902 is configured to: before the sending unit 901 sends the at least two physical broadcast channels on the at least two time-frequency resource locations, and perform addition of a cyclic redundancy check CRC code, channel coding, scrambling, and modulation in a same manner on the broadcast information carried on the at least two physical broadcast channels, to generate at least two corresponding broadcast channel signals.

The sending unit 901 is further configured to: send, on each of the at least two physical broadcast channels, a broadcast channel signal corresponding to broadcast information carried on the physical broadcast channel.

By using the base station provided in this embodiment of this application, the base station sends the at least two physical broadcast channels on the at least two time-frequency resource locations in the radio frame, and sends the indication information for the at least two physical broadcast channels. In this case, after receiving broadcast channel signals on two physical broadcast channels, the terminal device may determine, based on indication information of the two physical broadcast channels, that information other than time offsets of time-frequency resource locations is the same in broadcast information carried in the two broadcast channel signals, to further implement joint decoding on the two broadcast channel signals, and obtain broadcast information carried in one of the broadcast channel signals.

Figure 10:
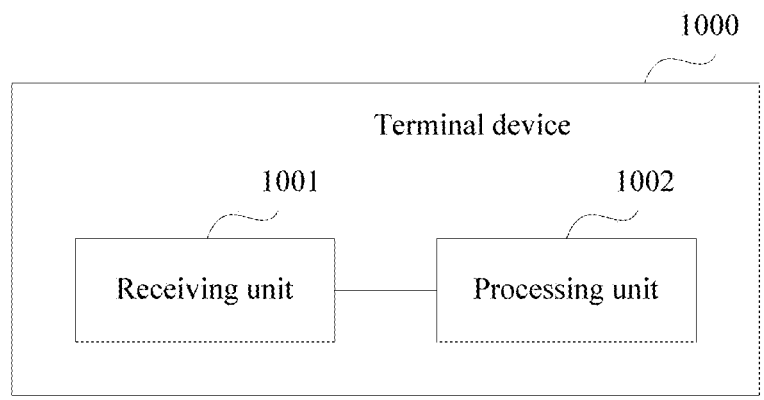
FIG. 10 is a structural diagram of a terminal device according to an embodiment of this application.

Based on the foregoing embodiments, an embodiment of this application provides a terminal device, and the terminal device is applied to the multi-beam wireless access system shown in FIG. 2, and is configured to implement the physical broadcast channel receiving method shown in FIG. 5. As shown in FIG. 10, the terminal device 1000 includes a receiving unit 1001 and a processing unit 1002.

The receiving unit 1001 is configured to: receive a first broadcast channel signal on a corresponding first physical broadcast channel at a first time-frequency resource location in a radio frame, and receive a second broadcast channel signal on a corresponding second physical broadcast channel at a second time-frequency resource location. The first broadcast channel signal carries first broadcast information, the first broadcast information includes a time offset of the first time-frequency resource location, the second broadcast channel signal carries second broadcast information, the second broadcast information includes a time offset of the second time-frequency resource location, and a time offset of any time-frequency resource location is information about a time interval between a time location of the time-frequency resource location in time domain and a frame header location of the radio frame.

The processing unit 1002 is configured to: determine that first information in the first broadcast information is the same as second information in the second broadcast information, where the first information is information other than the time offset of the first time-frequency resource location in the first broadcast information, and the second information is information other than the time offset of the second time-frequency resource location in the second broadcast information;

determine a time offset difference between the first time-frequency resource location and the second time-frequency resource location in time domain;

obtain a difference sequence corresponding to the time offset difference, and generate a scrambling sequence based on the difference sequence, where one time offset difference is corresponding to one unique difference sequence; and descramble the first broadcast channel signal based on the scrambling sequence, descramble the second broadcast channel signal based on a preset second scrambling sequence of the second broadcast channel signal, and perform joint decoding on the descrambled first broadcast channel signal and the descrambled second broadcast channel signal, to obtain the second broadcast information.

Optionally, as for determining that the first information is the same as the second information, the processing unit 1002 is further configured to:

obtain indication information of the first physical broadcast channel and the second physical broadcast channel, and determine, based on the indication information, that the first information is the same as the second information; or determine a first scrambling sequence of the first broadcast channel signal and the second scrambling sequence of the second broadcast channel signal from a plurality of preset scrambling sequences, and determine, based on the first scrambling sequence and the second scrambling sequence, that the first information is the same as the second information.

Optionally, the receiving unit 1001 is further configured to receive a first synchronization signal corresponding to the first physical broadcast channel and a second synchronization signal corresponding to the second physical broadcast channel; and as for obtaining the indication information, the processing unit 1002 is further configured to: obtain the indication information included in synchronization signal sequences carried in the first synchronization signal and the second synchronization signal.

Optionally, the indication information is the synchronization signal sequences carried in the first synchronization signal and the second synchronization signal.

Optionally, as for determining, based on the first scrambling sequence and the second scrambling sequence, that the first information is the same as the second information, the processing unit 1002 is further configured to: when determining that the first scrambling sequence is the same as the second scrambling sequence, determine that the first information is the same as the second information.

Optionally, the processing unit 1002 is further configured to: after obtaining the second broadcast information, obtain the time offset of the second time-frequency resource location included in the second broadcast information; and determine the frame header location of the radio frame based on a time location of the second time-frequency resource location in time domain and the obtained time offset of the second time-frequency resource location.

By using the terminal device provided in this embodiment of this application, the terminal device respectively receives the first broadcast channel signal on the corresponding first physical broadcast channel and the second broadcast channel signal at the first time-frequency resource location and the second time-frequency resource location in the at least two time-frequency resource locations. Any broadcast channel signal carries broadcast information, and the broadcast information includes a time offset of a corresponding time-frequency resource location. After determining that the first information (namely, the information other than the time offset of the first time-frequency resource location) in the first broadcast information is the same as the second information (namely, the information other than the time offset of the second time-frequency resource location) in the second broadcast information, the terminal device determines the time offset difference between the foregoing two time-frequency resource locations, and generates the scrambling sequence based on the time offset difference. The terminal device may descramble the first broadcast channel signal based on the scrambling sequence, and implement joint decoding on the descrambled first broadcast channel signal and the second broadcast channel signal descrambled based on the preset second scrambling sequence, to obtain the second broadcast information. In this case, the terminal device may obtain accurate broadcast information, may determine the frame header location of the radio frame based on a time offset of a time-frequency resource location included in the broadcast information, and access a network based on the obtained accurate frame header location of the radio frame and each piece of information (such as system information) carried in the broadcast information.

It should be noted that the unit division in the embodiments of this application is an example, and is merely logical function division. During actual implementation, another division manner may be used. Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some steps of the methods described in the embodiments of this application. However, the foregoing storage medium includes any medium that can store program code, such as a USB flash drive, a removable hard disk, a read-only memory (ROM), a random access memory (RAM), a magnetic disk, or an optical disc.

Figure 11:
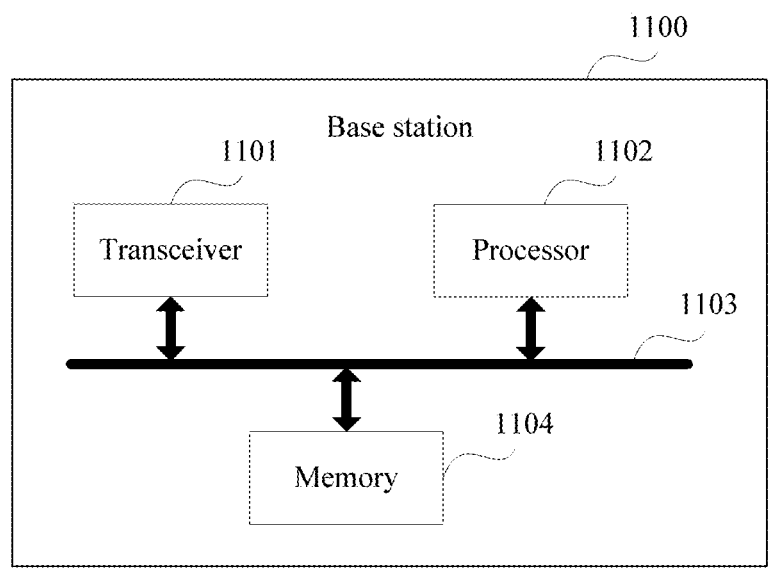
FIG. 11 is a structural diagram of another base station according to an embodiment of this application.

Based on the foregoing embodiments, an embodiment of the present invention further provides a base station. The base station is applied to the multi-beam wireless access system shown in FIG. 2, is configured to implement the physical broadcast channel sending method shown in FIG. 3, and has a function of the base station 900 shown in FIG. 9. As shown in FIG. 11, the base station 1100 includes a transceiver 1101, a processor 1102, and a bus 1103.

The transceiver 1101 and the processor 1102 are connected to each other by using the bus 1103. The bus 1103 may be a peripheral component interconnect (PCI) bus, an extended industry standard architecture (EISA) bus, or the like. The bus may be classified into an address bus, a data bus, a control bus, and the like. For ease of representation, only one thick line is used for representation in FIG. 11, but this does not mean that there is only one bus or only one type of bus.

The transceiver 1101 is configured to perform communication interaction with another device in the multi-beam wireless access system.

The processor 1102 is configured to implement the physical broadcast channel sending method shown in FIG. 3, and is further configured to:

send at least two physical broadcast channels on at least two time-frequency resource locations in a radio frame, where one time-frequency resource location is corresponding to one physical broadcast channel, the physical broadcast channel carries broadcast information, the broadcast information includes a time offset of a time-frequency resource location corresponding to the physical broadcast channel, the time offset of the time-frequency resource location corresponding to the physical broadcast channel is information about a time interval between a time location of the time-frequency resource location corresponding to the physical broadcast channel in time domain and a frame header location of the radio frame, and time offsets of the time-frequency resource locations included in broadcast information carried on the at least two physical broadcast channels are different; and send indication information for the at least two physical broadcast channels, where the indication information is used to notify a terminal device that information other than the time offsets of the time-frequency resource locations is the same in the broadcast information carried on the at least two physical broadcast channels.

Optionally, as for sending the indication information for the at least two physical broadcast channels, the processor 1102 is further configured to: send at least two synchronization signals, where any synchronization signal is corresponding to at least one of the at least two physical broadcast channels, and synchronization signal sequences carried in the at least two synchronization signals include the indication information of the at least two physical broadcast channels.

Optionally, the indication information is the synchronization signal sequences carried in the at least two synchronization signals.

Optionally, a difference between a time offset of any one of the at least two time-frequency resource locations and a time offset of another time-frequency resource location is corresponding to one unique difference sequence.

Optionally, as for sending the at least two physical broadcast channels on the at least two time-frequency resource locations in the radio frame, the processor 1102 is further configured to: perform addition of a cyclic redundancy check CRC code, channel coding, scrambling, and modulation in a same manner on the broadcast information carried on the at least two physical broadcast channels, to generate at least two corresponding broadcast channel signals; and send, on each of the at least two physical broadcast channels, a broadcast channel signal corresponding to broadcast information carried on the physical broadcast channel.

The base station 1100 further includes a memory 1104, configured to store a program and the like. Specifically, the program may include program code, and the program code includes a computer operation instruction. The memory 1104 may include a random access memory (RAM), and may further include a nonvolatile memory, such as at least one magnetic disk memory. The processor 1102 executes an application program stored in the memory 1104 and implements the foregoing function, to implement the physical broadcast channel sending method shown in FIG. 3.

By using the base station provided in this embodiment of this application, the base station sends the at least two physical broadcast channels on the at least two time-frequency resource locations in the radio frame, and sends the indication information for the at least two physical broadcast channels. In this case, after receiving broadcast channel signals on two physical broadcast channels, a terminal device may determine, based on indication information of the two physical broadcast channels, that information other than time offsets of time-frequency resource locations is the same in broadcast information carried in the two broadcast channel signals, to further implement joint decoding on the two broadcast channel signals, and obtain broadcast information carried in one of the broadcast channel signals.

Figure 12:
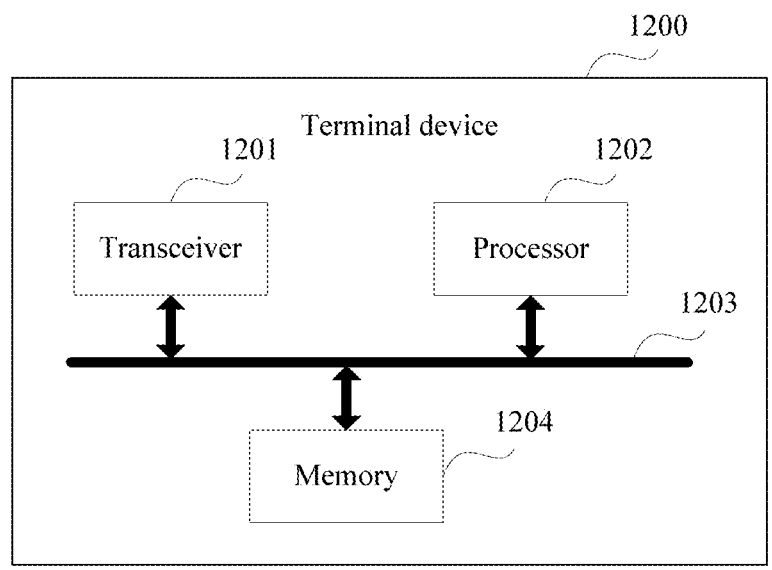
FIG. 12 is a structural diagram of another terminal device according to an embodiment of this application.

Based on the foregoing embodiments, an embodiment of the present invention further provides a terminal device. The terminal device is applied to the wireless access system shown in FIG. 2, is configured to implement the physical broadcast channel receiving method shown in FIG. 5, and has a function of the terminal device 1000 shown in FIG. 10. As shown in FIG. 12, the terminal device 1200 includes a transceiver 1201, a processor 1202, and a bus 1203.

The transceiver 1201 and the processor 1202 are connected to each other by using the bus 1203. The bus 1203 may be a peripheral component interconnect (PCI) bus, an extended industry standard architecture (EISA) bus, or the like. The bus may be classified into an address bus, a data bus, a control bus, and the like. For ease of representation, only one thick line is used for representation in FIG. 12, but this does not mean that there is only one bus or only one type of bus.

The transceiver 1201 is configured to perform communication interaction with another device in the multi-beam wireless access system.

The processor 1202 is configured to implement the physical broadcast channel receiving method shown in FIG. 5, and is further configured to:

receive a first broadcast channel signal on a corresponding first physical broadcast channel at a first time-frequency resource location in a radio frame, and receiving a second broadcast channel signal on a corresponding second physical broadcast channel at a second time-frequency resource location, where the first broadcast channel signal carries first broadcast information, the first broadcast information includes a time offset of the first time-frequency resource location, the second broadcast channel signal carries second broadcast information, the second broadcast information includes a time offset of the second time-frequency resource location, and a time offset of any time-frequency resource location is information about a time interval between a time location of the time-frequency resource location in time domain and a frame header location of the radio frame;

determine that first information in the first broadcast information is the same as second information in the second broadcast information, where the first information is information other than the time offset of the first time-frequency resource location in the first broadcast information, and the second information is information other than the time offset of the second time-frequency resource location in the second broadcast information; determine a time offset difference between the first time-frequency resource location and the second time-frequency resource location in time domain;

obtain a difference sequence corresponding to the time offset difference, and generating a scrambling sequence based on the difference sequence, where one time offset difference is corresponding to one unique difference sequence; and descramble the first broadcast channel signal based on the scrambling sequence, descrambling the second broadcast channel signal based on a preset second scrambling sequence of the second broadcast channel signal, and performing joint decoding on the descrambled first broadcast channel signal and the descrambled second broadcast channel signal, to obtain the second broadcast information.

Optionally, as for determining that the first information is the same as the second information, the processor 1202 is further configured to:

obtain indication information of the first physical broadcast channel and the second physical broadcast channel, and determine, based on the indication information, that the first information is the same as the second information; or determine a first scrambling sequence of the first broadcast channel signal and the second scrambling sequence of the second broadcast channel signal from a plurality of preset scrambling sequences, and determine, based on the first scrambling sequence and the second scrambling sequence, that the first information is the same as the second information.

Optionally, as for obtaining the indication information of the first physical broadcast channel and the second physical broadcast channel, the processor 1202 is further configured to: receive a first synchronization signal corresponding to the first physical broadcast channel and a second synchronization signal corresponding to the second physical broadcast channel; and obtain the indication information included in synchronization signal sequences carried in the first synchronization signal and the second synchronization signal.

Optionally, the indication information is the synchronization signal sequences carried in the first synchronization signal and the second synchronization signal.

Optionally, as for determining, based on the first scrambling sequence and the second scrambling sequence, that the first information is the same as the second information, the processor 1202 is further configured to: when determining that the first scrambling sequence is the same as the second scrambling sequence, determine that the first information is the same as the second information.

Optionally, the processor 1202 is further configured to:
after obtaining the second broadcast information, obtain the time offset of the second time-frequency resource location included in the second broadcast information; and determine the frame header location of the radio frame based on a time location of the second time-frequency resource location in time domain and the obtained time offset of the second time-frequency resource location.

The terminal device 1200 further includes a memory 1204, configured to store a program and the like. Specifically, the program may include program code, and the program code includes a computer operation instruction. The memory 1204 may include a random access memory (RAM), and may further include a nonvolatile memory, such as at least one magnetic disk memory. The processor 1202 executes an application program stored in the memory 1204 and implements the foregoing function, to implement the physical broadcast channel receiving method shown in FIG. 5.

By using the terminal device provided in this embodiment of this application, the terminal device respectively receives the first broadcast channel signal on the corresponding first physical broadcast channel and the second broadcast channel signal at the first time-frequency resource location and the second time-frequency resource location in the at least two time-frequency resource locations. Any broadcast channel signal carries broadcast information, and the broadcast information includes a time offset of a corresponding time-frequency resource location. After determining that the first information (namely, the information other than the time offset of the first time-frequency resource location) in the first broadcast information is the same as the second information (namely, the information other than the time offset of the second time-frequency resource location) in the second broadcast information, the terminal device determines the time offset difference between the foregoing two time-frequency resource locations, and generates the scrambling sequence based on the time offset difference. The terminal device may descramble the first broadcast channel signal based on the scrambling sequence, and implement joint decoding on the descrambled first broadcast channel signal and the second broadcast channel signal descrambled based on the preset second scrambling sequence, to obtain the second broadcast information. In this case, the terminal device may obtain accurate broadcast information, may determine the frame header location of the radio frame based on a time offset of a time-frequency resource location included in the broadcast information, and access a network based on the obtained accurate frame header location of the radio frame and each piece of information (such as system information) carried in the broadcast information.

By using the physical broadcast channel sending/receiving method and the apparatus provided in the embodiments of this application, the base station in the multi-beam wireless access system sends the at least two physical broadcast channels on the at least two time-frequency resource locations in the radio frame; and the terminal device respectively receives the first broadcast channel signal on the corresponding first physical broadcast channel and the second broadcast channel signal at the first time-frequency resource location and the second time-frequency resource location in the at least two time-frequency resource locations. Any broadcast channel signal carries broadcast information, and the broadcast information includes a time offset of a corresponding time-frequency resource location. After determining that the first information (namely, the information other than the time offset of the first time-frequency resource location) in the first broadcast information is the same as the second information (namely, the information other than the time offset of the second time-frequency resource location) in the second broadcast information, the terminal device determines the time offset difference between the foregoing two time-frequency resource locations, and generates the scrambling sequence based on the time offset difference. The terminal device may descramble the first broadcast channel signal based on the scrambling sequence, and implement joint decoding on the descrambled first broadcast channel signal and the second broadcast channel signal descrambled based on the preset second scrambling sequence, to obtain the second broadcast information. In this case, the terminal device may obtain accurate broadcast information, may determine the frame header location of the radio frame based on a time offset of a time-frequency resource location included in the broadcast information, and access the network based on the obtained accurate frame header location of the radio frame and each piece of information (such as system information) carried in the broadcast information.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a magnetic disk memory, a CD-ROM, and an optical memory) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or the processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of this application have been described, persons skilled in the art can make changes and modifications to these embodiments once they learn the basic inventive concept. Therefore, the following claims are intended to be construed as to cover the preferred embodiments and all changes and modifications falling within the scope of this application.

Obviously, persons skilled in the art can make various modifications and variations to the embodiments of this application without departing from the spirit and scope of the embodiments of this application. This application is intended to cover these modifications and variations provided that they fall within the scope of the claims of this application and their equivalent technologies.

The invention claimed is:

1. A method comprising:
receiving, by a terminal device, a first broadcast channel signal on a first physical broadcast channel at a first time-frequency resource location in a radio frame, wherein the first broadcast channel signal carries first broadcast information, the first broadcast information comprises first information, and the first information indicates a time offset of the first time-frequency resource location;
receiving, by the terminal device, a second broadcast channel signal on a second physical broadcast channel at a second time-frequency resource location in the radio frame, wherein the second broadcast channel signal carries second broadcast information, the second broadcast information comprises second information, the second information indicates a time offset of the second time-frequency resource location; and
receiving, by the terminal device, an indication, wherein the indication indicates that the first broadcast information other than the first information is same as the second broadcast information other than the second information.

2. The method according to claim 1, wherein the indication is comprised in a synchronization signal sequence carried in a first synchronization signal corresponding to the first physical broadcast channel and carried in a second synchronization signal corresponding to the second physical broadcast channel.

3. The method according to claim 1, wherein receiving the indication comprises:
receiving, by the terminal device, a first synchronization signal corresponding to the first physical broadcast channel;
receiving, by the terminal device, a second synchronization signal corresponding to the second physical broadcast channel; and
determining, by the terminal device according to the first synchronization signal and the second synchronization signal, that the first broadcast information other than the first information is the same as the second broadcast information other than the second information.

4. The method according to claim 3, wherein the determining comprises:
determining, by the terminal device according to a synchronization signal sequence carried in the first synchronization signal and the second synchronization signal, that the first broadcast information other than the first information is the same as the second broadcast information other than the second information.

5. The method according to claim 1, wherein the time offset of the first time-frequency resource location and the time offset of the second time-frequency resource location are different.

6. A method comprising:
sending, by a network device, a first broadcast channel signal on a first physical broadcast channel at a first time-frequency resource location in a radio frame, wherein the first broadcast channel signal carries first broadcast information, the first broadcast information comprises first information, and the first information indicates a time offset of the first time-frequency resource location;

sending, by the network device, a second broadcast channel signal on a second physical broadcast channel at a second time-frequency resource location in the radio frame, wherein the second broadcast channel signal carries second broadcast information, the second broadcast information comprises second information, the second information indicates a time offset of the second time-frequency resource location; and sending, by the network device, an indication, wherein the indication indicates that the first broadcast information other than the first information is same as the second broadcast information other than the second information.

7. The method according to claim 6, wherein the indication is comprised in a synchronization signal sequence carried in a first synchronization signal corresponding to the first physical broadcast channel and carried in a second synchronization signal corresponding to the second physical broadcast channel.

8. The method according to claim 6, wherein sending the indication comprises:

sending, by the network device, a first synchronization signal corresponding to the first physical broadcast channel; and sending, by the network device, a second synchronization signal corresponding to the second physical broadcast channel, wherein the first synchronization signal and the second synchronization signal indicate that the first broadcast information other than the first information is the same as the second broadcast information other than the second information.

9. The method according to claim 8, wherein a synchronization signal sequence carried in the first synchronization signal and the second synchronization signal indicates that the first broadcast information other than the first information is the same as the second broadcast information other than the second information.

10. The method according to claim 6, wherein the time offset of the first time-frequency resource location and the time offset of the second time-frequency resource location are different.

11. An apparatus comprising:
a non-transitory storage medium including executable instructions; and
a processor;
wherein the executable instructions, when executed by the processor, cause the apparatus to:
receive a first broadcast channel signal on a first physical broadcast channel at a first time-frequency resource location in a radio frame, wherein the first broadcast channel signal carries first broadcast information, the first broadcast information comprises first information, and the first information indicates a time offset of the first time-frequency resource location;
receive a second broadcast channel signal on a second physical broadcast channel at a second time-frequency resource location in the radio frame, wherein the second broadcast channel signal carries second broadcast information, the second broadcast information comprises second information, the second information indicates a time offset of the second time-frequency resource location, and the first broadcast information other than the first information is same as the second broadcast information other than the second information; and
receive an indication indicating that the first broadcast information other than the first information is same as the second broadcast information other than the second information.

12. The apparatus according to claim 11, wherein the indication is comprised in a synchronization signal sequence carried in a first synchronization signal corresponding to the first physical broadcast channel and carried in a second synchronization signal corresponding to the second physical broadcast channel.

13. The apparatus according to claim 11, wherein the executable instructions, when executed by the processor, further cause the apparatus to:
receive a first synchronization signal corresponding to the first physical broadcast channel;
receive a second synchronization signal corresponding to the second physical broadcast channel; and
determine, according to the first synchronization signal and the second synchronization signal, that the first broadcast information other than the first information is the same as the second broadcast information other than the second information.

14. The apparatus according to claim 13, wherein the executable instructions, when executed by the processor, further cause the apparatus to:
determine, according to a synchronization signal sequence carried in the first synchronization signal and the second synchronization signal, that the first broadcast information other than the first information is the same as the second broadcast information other than the second information.

15. The apparatus according to claim 11, wherein the time offset of the first time-frequency resource location and the time offset of the second time-frequency resource location are different.

16. An apparatus comprising:
a non-transitory storage medium including executable instructions; and
a processor;
wherein the executable instructions, when executed by the processor, cause the apparatus to:
send a first broadcast channel signal on a first physical broadcast channel at a first time-frequency resource location in a radio frame, wherein the first broadcast channel signal carries first broadcast information, the first broadcast information comprises first information, and the first information indicates a time offset of the first time-frequency resource location;
send a second broadcast channel signal on a second physical broadcast channel at a second time-frequency resource location in the radio frame, wherein the second broadcast channel signal carries second broadcast information, the second broadcast information comprises second information, the second information indicates a time offset of the second time-frequency resource location; and
send an indication, wherein the indication indicates that the first broadcast information other than the first information is same as the second broadcast information other than the second information.

17. The apparatus according to claim 16, wherein the indication is comprised in a synchronization signal sequence carried in a first synchronization signal corresponding to the first physical broadcast channel and carried in a second synchronization signal corresponding to the second physical broadcast channel.

18. The apparatus according to claim 16, wherein the executable instructions, when executed by the processor, further cause the apparatus to:
send a first synchronization signal corresponding to the first physical broadcast channel; and
send a second synchronization signal corresponding to the second physical broadcast channel, wherein the first synchronization signal and the second synchronization signal indicate that the first broadcast information other than the first information is the same as the second broadcast information other than the second information.

19. The apparatus according to claim 18, wherein a synchronization signal sequence carried in the first synchronization signal and the second synchronization signal indicates that the first broadcast information other than the first information is the same as the second broadcast information other than the second information.

20. The apparatus according to claim 16, wherein the time offset of the first time-frequency resource location and the time offset of the second time-frequency resource location are different.

* * * * *